(12) United States Patent
Sasabayashi

(10) Patent No.: US 7,499,131 B2
(45) Date of Patent: Mar. 3, 2009

(54) LIQUID CRYSTAL DISPLAY DEVICE WITH DIFFERENT ALIGNMENTS

(75) Inventor: Takashi Sasabayashi, Kawasaki (JP)

(73) Assignees: Fujitsu Limited, Kawasaki (JP); AU Optronics Corporation (TW)

( * ) Notice: Subject to any disclaimer, the term of this patent is extended or adjusted under 35 U.S.C. 154(b) by 91 days.

(21) Appl. No.: 10/935,382

(22) Filed: Sep. 7, 2004

(65) Prior Publication Data

US 2005/0162594 A1   Jul. 28, 2005

(30) Foreign Application Priority Data

Jan. 28, 2004   (JP)   ............... 2004-019454

(51) Int. Cl.
   *G02F 1/1339*   (2006.01)
   *G02F 1/1337*   (2006.01)
(52) U.S. Cl. ............... 349/123; 349/130; 349/132; 349/156; 349/191; 349/124; 349/125; 349/126; 349/127; 349/128; 349/129
(58) Field of Classification Search ......... 349/123–129, 349/178, 130, 132, 156, 191
   See application file for complete search history.

(56) References Cited

U.S. PATENT DOCUMENTS

| | | | |
|---|---|---|---|
| 6,525,797 B2 * | 2/2003 | Tsuda et al. ............. | 349/139 |
| 6,642,983 B2 * | 11/2003 | Liu et al. ............. | 349/129 |
| 6,829,028 B2 * | 12/2004 | Lai et al. ............. | 349/130 |
| 2001/0019386 A1 * | 9/2001 | Lee et al. ............. | 349/123 |
| 2002/0085154 A1 * | 7/2002 | Hattori et al. ............. | 349/123 |
| 2002/0126245 A1 * | 9/2002 | Towler et al. ............. | 349/123 |
| 2002/0159018 A1 | 10/2002 | Kataoka et al. ............. | 349/143 |
| 2003/0048401 A1 * | 3/2003 | Hanaoka et al. ............. | 349/123 |
| 2003/0231272 A1 * | 12/2003 | Nakamura et al. ............. | 349/123 |

FOREIGN PATENT DOCUMENTS

| | | |
|---|---|---|
| JP | 10062623 A | 3/1998 |
| JP | 2947350 | 7/1999 |
| JP | 2002-107730 | 4/2002 |

* cited by examiner

*Primary Examiner*—David Nelms
*Assistant Examiner*—Hoan C Nguyen
(74) *Attorney, Agent, or Firm*—Greer, Burns & Crain, Ltd.

(57) ABSTRACT

A liquid crystal display device of the present invention has a first structure (protrusion) which is provided on a first substrate and which causes liquid crystal molecules in the vicinity of the first structure to align with a first direction when a voltage is applied, and a second structure (protrusion) which is provided at a position on the second substrate where the second structure is opposed to the first structure and which causes liquid crystal molecules in the vicinity of the second structure to align with a second direction when the voltage is applied. Here, the second direction is different from the first direction. The shapes or sizes of the first and second structures are different from each other.

8 Claims, 22 Drawing Sheets

FIG. 11
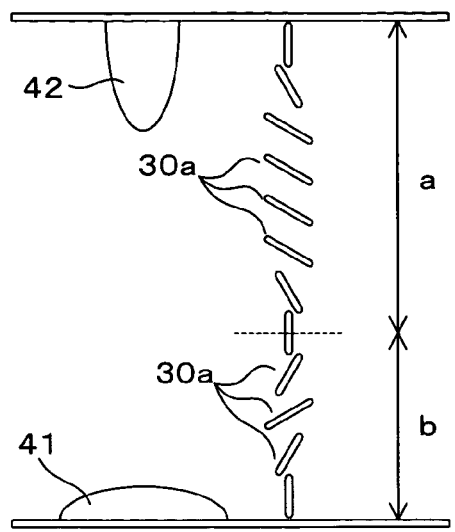
FIG. 12  a:b=9:1
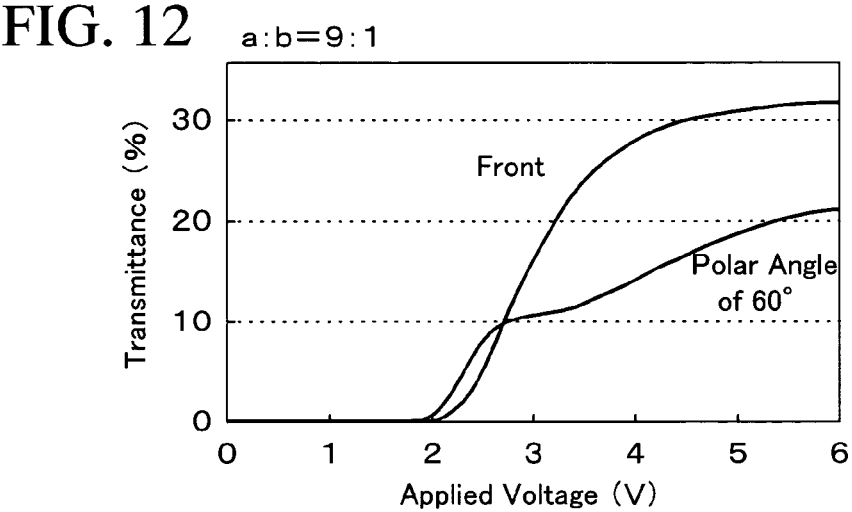
FIG. 13
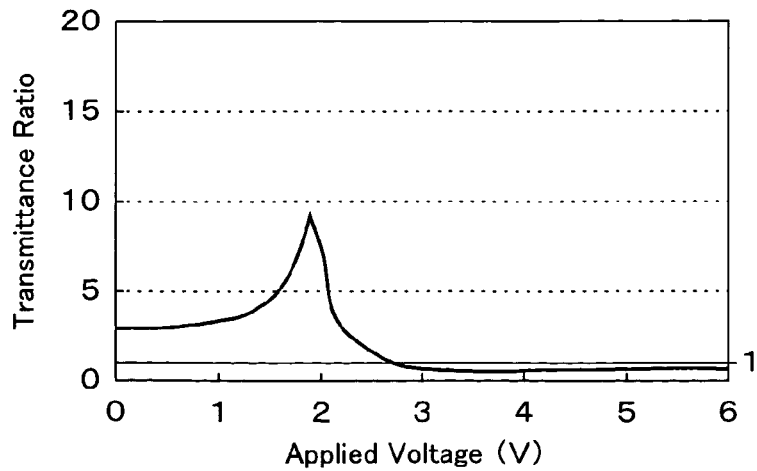

LIQUID CRYSTAL DISPLAY DEVICE WITH DIFFERENT ALIGNMENTS

CROSS-REFERENCE TO RELATED APPLICATIONS

This application is based on and claims priority of Japanese Patent Application No. 2004-019454 filed on Jan. 28, 2004, the entire contents of which are incorporated herein by reference.

BACKGROUND OF THE INVENTION

1. Field of the Invention

The present invention relates to a liquid crystal display device constructed by filling liquid crystals into the space between a pair of substrates. In particular, the present invention relates to a multi-domain vertical alignment (MVA) liquid crystal display device which is provided with domain regulation structures for forming, in each picture element, a plurality of areas (domains) where the directions of liquid crystal molecules are different from each other.

2. Description of the Prior Art

Liquid crystal display devices have the advantages that they are thin and light and that they can be driven at low voltages to have low power consumption. Accordingly, liquid crystal display devices are widely used in various kinds of electronic devices. In particular, active matrix liquid crystal display devices in which a thin film transistor (TFT) is provided for each picture element are comparable in display quality to cathode-ray tube (CRT) displays, and are therefore widely used in televisions and displays for personal computers and the like.

However, a general liquid crystal display device is inferior in viewing angle characteristics in comparison with CRT displays. In other words, contrast and color greatly change depending on whether a screen is viewed from the front thereof or from an oblique direction.

As a liquid crystal display device which is excellent in viewing angle characteristics, MVA liquid crystal display devices have been conventional (Japanese Patent Publication No. 2947350 (Patent Literature 1) and Laid-open Japanese Patent Publication No. 2002-107730 (Patent Literature 2)).

FIG. 1 is a plan view showing a picture element part of an MVA liquid crystal display device. FIG. 2 is a schematic cross-sectional view of the same MVA liquid crystal display device. Incidentally, liquid crystal display devices include a transmission type liquid crystal display device in which a backlight is used as a light source to perform display by use of light passing through a liquid crystal panel, a reflection type liquid crystal display device in which display is performed by use of the reflection of outside light (natural light or lamplight), and a semi-transmission type liquid crystal display device in which a backlight is used where it is dark and in which display is performed by use of the reflection of outside light where it is bright. Here, a transmission type liquid crystal display device will be described.

An MVA liquid crystal display device has first and second substrates 10 and 20 made of transparent thin plates of glass or the like, and a liquid crystal layer 30 made of nematic liquid crystal with negative dielectric anisotropy which fills the space between these substrates 10 and 20. On the substrate 10, as shown in FIG. 1, a plurality of gate bus lines 11a and a plurality of auxiliary capacitance bus lines 11b horizontally extending and a plurality of data bus lines 13 vertically extending are formed. The gate bus lines 11a and the auxiliary capacitance bus lines 11b are placed alternately with respect to the vertical direction.

Each of the rectangular areas surrounded by the gate and data bus lines 11a and 13 is defined as a picture element (sub-pixel) area. As described later, one pixel P is constituted by three picture elements of a red (R) picture element, a green (G) picture element, and a blue (B) picture element, which are placed along a horizontal direction.

On the substrate 10, a thin film transistor (TFT) 14, an auxiliary capacitance electrode 15, and a picture element electrode 16 are formed for each picture element area. In this liquid crystal display device shown in FIG. 1, a part of the gate bus line 11a is used as the gate electrode of the TFT 14. Moreover, the drain electrode 14d of the TFT 14 is connected to the data bus line 13. The picture element electrode 16 is made of transparent conductive material, such as indium-tin oxide (ITO) or the like, and electrically connected to the source electrode 14s of the TFT 14 and the auxiliary capacitance electrode 15 through contact holes C1 and C2. Each auxiliary capacitance electrode 15 is formed at a position where it is opposed to the auxiliary capacitance bus line 11b.

Hereinafter, a layered structure on the first substrate 10 will be described with reference to FIGS. 1 and 2.

The gate bus lines 11a and the auxiliary capacitance bus lines 11b are formed in the same layer. On the gate bus lines 11a and the auxiliary capacitance bus lines 11b, a first insulating film (gate insulating film) 12a is formed. On predetermined areas of the first insulating film 12a, semiconductor layers (not shown) to be active layers of the TFTs 14 are formed. On these semiconductor layers, channel protection films (not shown), and the source and drain electrodes 14s and 14d of the TFTs 14 are formed. Moreover, on the first insulating film 12a, the data bus lines 13 and the auxiliary capacitance electrodes 15 are formed.

The data bus lines 13, the auxiliary capacitance electrodes 15, the source and drain electrodes 14s and 14d are covered with a second insulating film 12b. On this second insulating film 12b, the picture element electrodes 16 are formed.

On the picture element electrodes 16, a plurality of protrusions (banks) 17 extending in oblique directions relative to the data bus lines 13 are formed. These protrusions 17 are formed of, for example, photoresist, and are bent at portions where the protrusions 17 intersect the gate bus lines 11a and the auxiliary capacitance bus lines 11b. Moreover, the surfaces of the picture element electrodes 16 and the protrusions 17 are covered with an alignment film 18 made of polyimide or the like.

Hereinafter, a layered structure on the second substrate 20 will be described with reference to FIG. 2.

On the surface of the substrate 20 which faces the liquid crystal layer 30, a black matrix (shading film, not shown) made of, for example, Cr (chromium) and color filters 22 are formed. The black matrix is formed in portions where it is opposed to the gate and data bus lines 11a and 13 and the TFTs 14. Further, in each picture element area, a color filter 22 of any color of red (R), green (G), and blue (B) is placed to be opposed to the picture element electrode 16. In this example, one pixel P is constituted of three picture elements aligned horizontally, which are a red picture element in which a red filter is placed, a green picture element in which a green filter is placed, and a blue picture element in which a blue filter is placed.

On the color filters 22 (under the color filters 22 in FIG. 2), an opposing electrode (common electrode) 23 made of transparent conductive material, such as ITO or the like, is formed. On the opposing electrode 23, protrusions 24 are formed. The protrusions 24 are formed of, for example, photoresist, and placed between the protrusions 17 on the substrate 10 as shown in FIG. 2. The surfaces of the opposing electrode 23 and the protrusions 24 are covered with an alignment film 25 made of polyimide or the like.

The substrates 10 and 20 are placed in a manner such that the surfaces thereof on which the alignment films 18 and 25 are formed are opposed to each other. Into the space between these substrates 10 and 20, liquid crystals (liquid crystal layer 30) are filled. The structure constructed by filling the space between the substrates 10 and 20 with the liquid crystal is hereinafter referred to as a liquid crystal panel. Moreover, the substrate (substrate 10 in this example) on which the TFTs 14 are formed is referred to as a TFT substrate, and the substrate (substrate 20 in this example) placed to be opposed to the TFT substrate is referred to as an opposing substrate.

Two polarizing plates (not shown) are placed with the liquid crystal panel interposed therebetween in the state where the absorption axes thereof are orthogonal. Moreover, the liquid crystal panel is connected to a driving circuit, and display signals (R, G, and B signals) and scan signals are supplied from the driving circuit.

In the liquid crystal display device configured as described above, liquid crystal molecules 30a are vertically aligned with the surfaces of the alignment films 18 and 24 in the state where a voltage is not applied to the electrodes 16 and 23. Accordingly, as shown in FIG. 2, though the liquid crystal molecules 30a in the vicinities of the protrusions 17 and 24 are obliquely aligned with the surfaces of the substrates, most liquid crystal molecules 30a are vertically aligned with the surfaces of the substrates. In this case, light entering the liquid crystal layer 30 from the bottom of the substrate 10 through one polarizing plate passes through the liquid crystal layer 30 without change in the polarization direction thereof, and is blocked by the polarizing plate on the substrate 20. That is, this case results in dark display.

On the other hand, when a voltage higher than a predetermined voltage (threshold voltage) is applied as a display signal to a data bus line 13 and a scan signal is supplied to a gate bus line 11a, the TFT 14 is turned on, and thus the display signal is written to the picture element electrode 16. This causes the liquid crystal molecules 30a between the picture element electrode 16 and the opposing electrode 23 to be obliquely aligned with the electric field as shown in FIG. 3. In this state, light entering the liquid crystal layer 30 from the bottom of the substrate 10 through the polarizing plate changes the polarization direction thereof in the liquid crystal layer 30 to pass through the polarizing plate on the substrate 20. That is, this case results in bright display.

It is possible to also display intermediate tones by adjusting a voltage applied to the picture element electrode 16. Further, It is possible to display a desired image on the liquid crystal display device by controlling a voltage applied to the picture element electrode for each picture element.

Since the protrusions 17 and 24 are provided in the above-described MVA liquid crystal display device, the tilt directions of the liquid crystal molecules 30a are different on both sides of each of the protrusions 17 and 24 as boundaries. In the case where the protrusions 17 and 24 are formed on the basis of a pattern as shown in FIG. 1, the tilt directions of the liquid crystal molecules 30a are different from each other among areas A1, A2, A3, and A4 as shown in FIG. 4. When multi-domain is thus achieved, the leakage of light in an oblique direction relative to the surfaces of the substrates is suppressed. Accordingly, viewing angle characteristics are significantly improved.

Further, in the above-described example, the description has been performed for the case where the protrusions 17 and 24 are used as domain regulation structures. However, slits provided in at least any one of the picture element electrodes 16 and the opposing electrode 23, or dents (grooves) provided in the substrate surfaces (electrodes or insulating film thereon) may be used as domain regulation structures.

Moreover, in Laid-open Japanese Patent Publication No. Hei 10(1998)-62623 (Patent Literature 3), a proposition is performed for improvement of viewing angle characteristics by forming an optical compensation layer inside a liquid crystal panel.

However, the inventors of the present application suppose that the aforementioned conventional MVA liquid crystal display device has the following problem. Specifically, in the aforementioned conventional MVA liquid crystal display device, there occurs the phenomenon (hereinafter referred to as discolor) in which a portion with a low brightness looks whitish when a screen is viewed from an oblique direction.

SUMMARY OF THE INVENTION

An object of the present invention is to provide a liquid crystal display device wherein it is possible to suppress the phenomenon (discolor) in which a portion with a low brightness looks whitish when a screen is viewed from an oblique direction and further to improve display performance.

A liquid crystal display device of a first invention of the present application has: a first structure which is provided on the first substrate and which causes liquid crystal molecules in a vicinity of the first structure to align with a first direction when a voltage is applied; and a second structure which is provided on the second substrate and at a position where the second structure is opposed to the first structure and which causes liquid crystal molecules in a vicinity of the second structure to align with a second direction when the voltage is applied. Here, the second direction is different from the first direction.

By these first and second structures, two areas (first and second areas) where the alignment directions of liquid crystal molecules are different from each other are formed along the thickness direction of a liquid crystal layer. The leakage of light in an oblique direction can be suppressed by forming, along the thickness direction of the liquid crystal layer, two areas where the alignment directions are different from each other as described above. As a result, the phenomenon (discolor) in which a screen looks whitish when it is viewed from an oblique direction is suppressed.

As the first and second structures, for example, protrusions formed of dielectric material can be used. In the case where liquid crystals with negative dielectric anisotropy are used, the liquid crystal molecules in the vicinity of each protrusion are aligned with a direction perpendicular to the surface of the protrusion. Two areas (first and second areas) where the alignment directions of liquid crystal molecules are different from each other can be formed along the thickness direction of the liquid crystal layer by respectively placing protrusions on the first and second substrates in a manner such that the protrusions are opposed to each other.

In this case, if the protrusion on the first substrate and that on the second substrate are same shapes and sizes as each other, it is supposed that it results in instability of the boundary position between the first and second areas, and thus in the deterioration of display characteristics. Accordingly, it is preferred that the protrusion (first structure) on the first substrate and that (second structure) on the second substrate are different in the sizes or shapes from each other.

A liquid crystal display device of a second invention of the present application has: a liquid crystal panel which is constructed by filling a space between a pair of substrates with liquid crystals and which has, within each picture element, a plurality of areas where alignment directions of liquid crystal molecules when a voltage is applied are different from each other; a polarizing plate placed on at least one side of the liquid crystal panel; and an optical compensation layer in which optical axes are tilted relative to substrate planes and in which directions of the optical axes when the optical axes are projected onto the substrate planes are set for the respective areas.

Improving viewing angle characteristics is effective in preventing the discolor of a liquid crystal display device. Heretofore, viewing angle characteristics of a liquid crystal display device have been improved using an optical compensation film. However, the optical axes of optical compensation films generally used exist in an in-plane direction of the film or in a direction of the normal to the film. Therefore, it is in principle impossible to improve characteristics when a screen is viewed from the direction of the absorption axis of a polarizing plate.

The present invention uses an optical compensation layer of which optical axes are tilted relative to the surfaces of the substrates. Consequently, it is possible to improve viewing angle characteristics in the direction of the absorption axis of a polarizing plate, and to suppress the phenomenon (discolor) in which a screen looks whitish when it is viewed from an oblique direction.

The following steps are performed for forming the optical compensation layer of which optical axes are tilted relative to the surfaces of the substrates. Those are, for example, steps of applying solvent containing liquid crystalline polymers to the surface of an alignment film, and then causing the liquid crystalline polymers to align with predetermined directions, followed by fixing the alignment of the liquid crystalline polymers by heat treatment.

BRIEF DESCRIPTION OF THE DRAWINGS

FIG. 11 is a schematic diagram showing the alignment states of liquid crystal molecules of a liquid crystal display device in which protrusions having different shapes are respectively placed on two substrates in a manner such that the protrusions are opposed to each other.

FIG. 12 is a diagram showing the result of simulation calculation of T-V characteristics of a liquid crystal display device in which, with regard to the ratio of the length a of one area in the layer thickness direction to the length b of the other area in the layer thickness direction, a:b=9:1 (a/b=9).

FIG. 13 is a diagram showing the result of simulation calculation of the relationship between an applied voltage and a transmittance ratio of the liquid crystal display device in which, with regard to the ratio of the length a of one area in the layer thickness direction to the length b of the other area in the layer thickness direction, a:b=9:1.

DESCRIPTION OF THE PREFERRED EMBODIMENTS

Hereinafter, the present invention will be described in more detail.

First Embodiment

Figure 1:
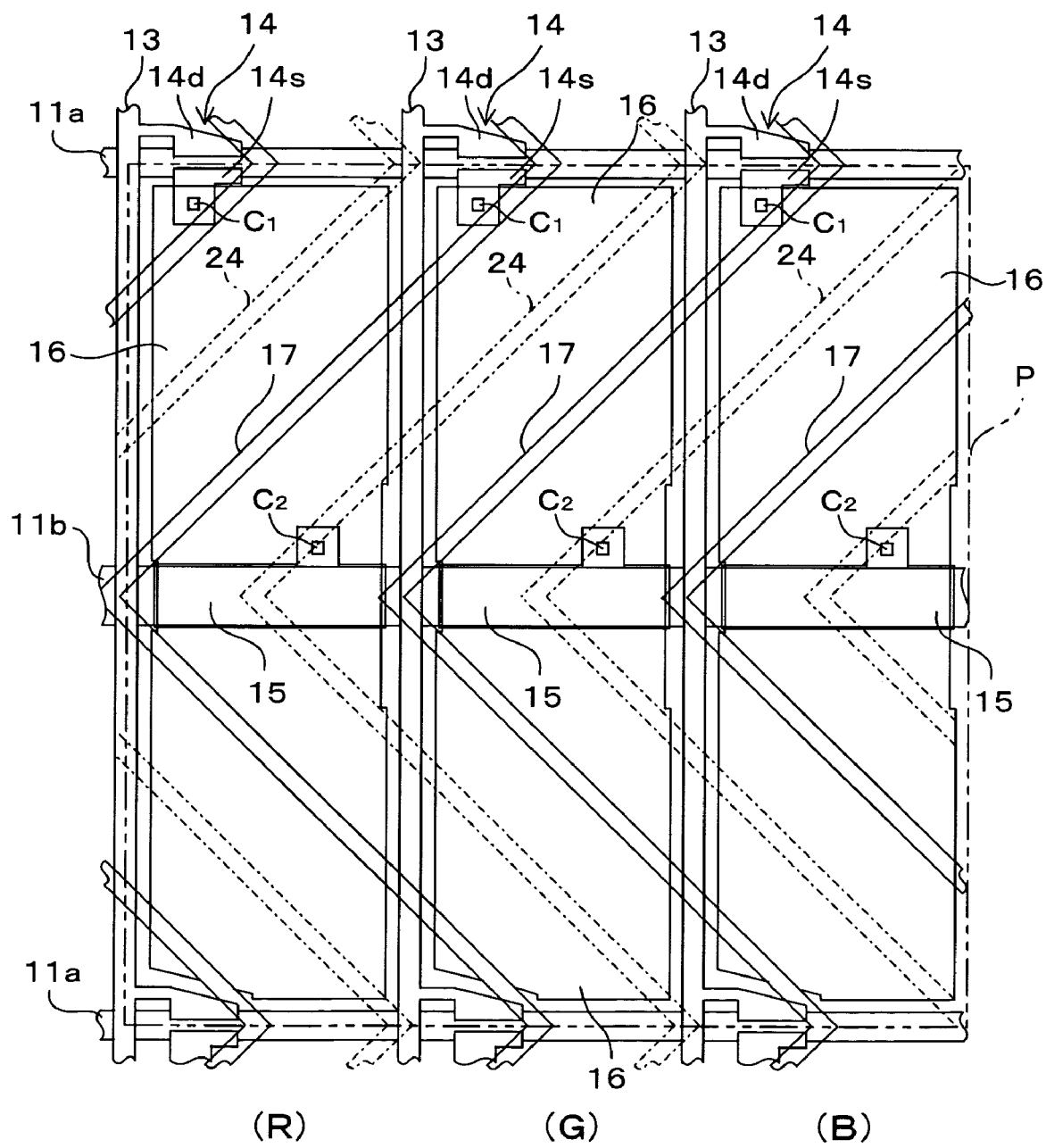
FIG. 1 is a plan view showing a picture element part of a conventional MVA liquid crystal display device.
Figure 2:
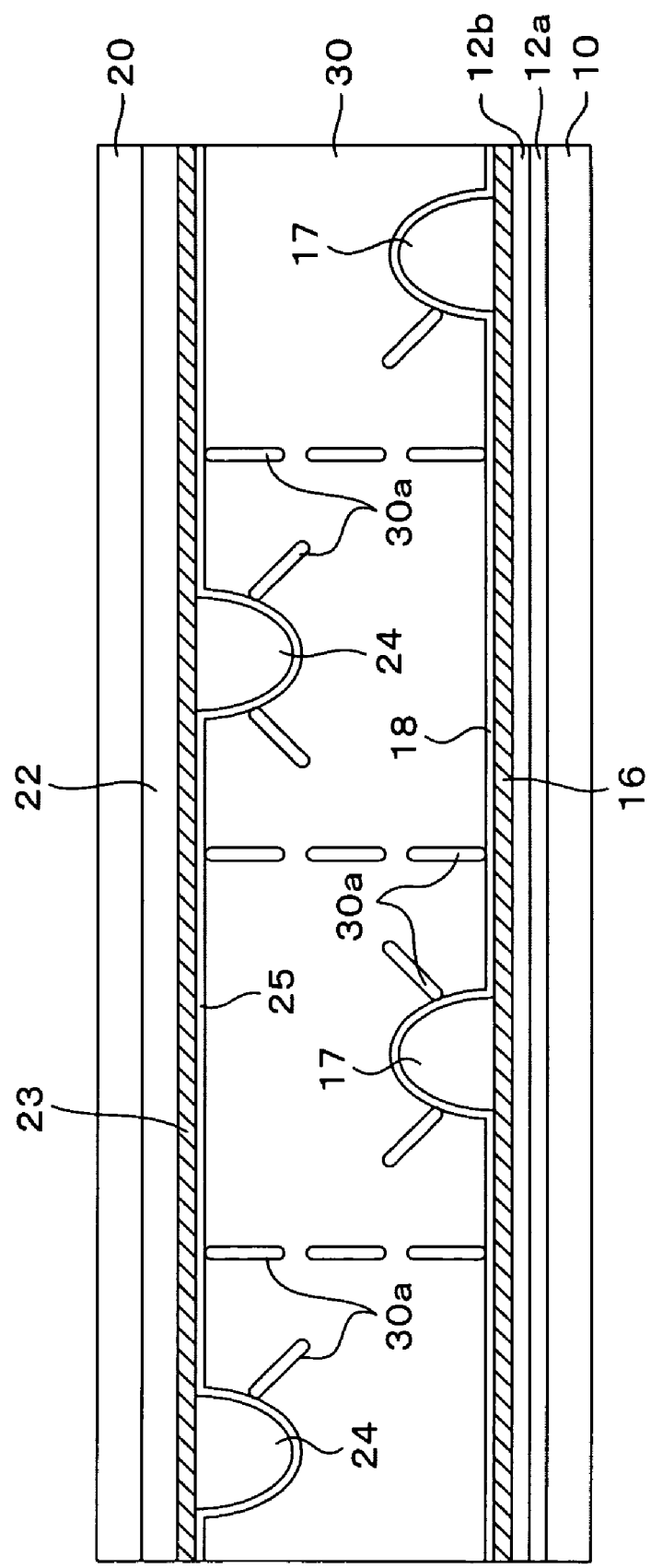
FIG. 2 is a schematic cross-sectional view of the same conventional MVA liquid crystal display device.
Figure 3:
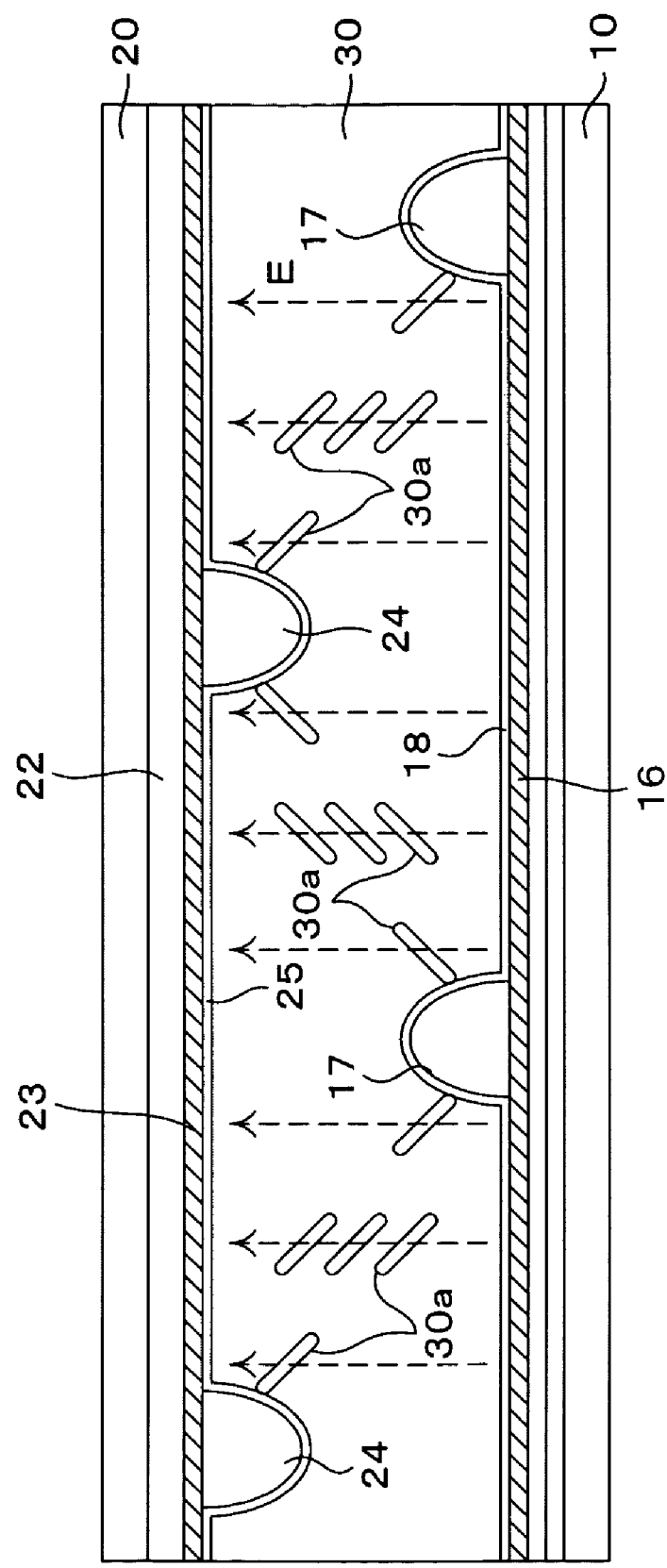
FIG. 3 is a schematic diagram showing the alignment states of liquid crystal molecules of the same conventional MVA liquid crystal display device when a voltage is applied.
Figure 4:
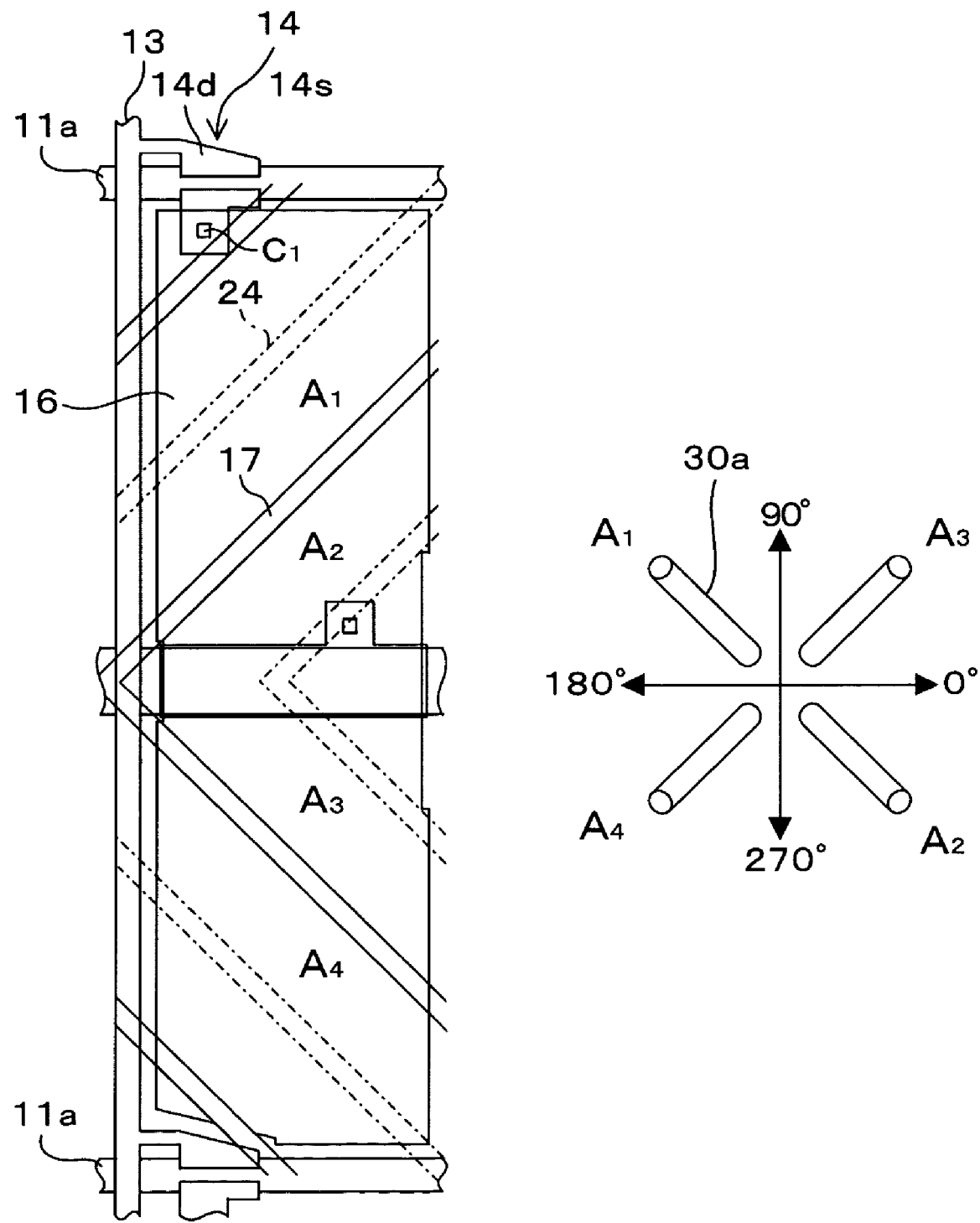
FIG. 4 is a schematic diagram showing the state of alignment division in the MVA liquid crystal display device.
Figure 5:
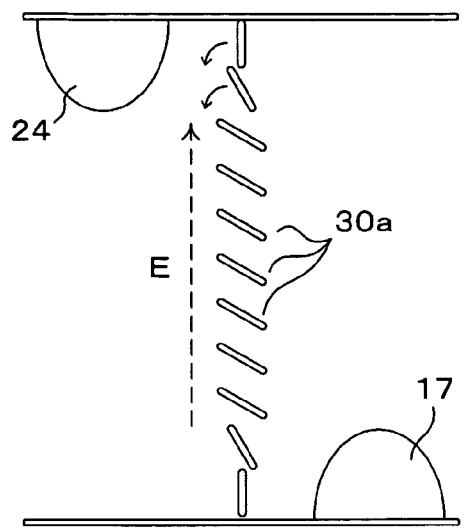
FIG. 5 is a schematic diagram showing the alignment states of the liquid crystal molecules between substrates of the conventional liquid crystal display device shown in FIGS. 1 and 2 when a voltage is applied.

FIG. 5 is a schematic diagram showing the alignment states of liquid crystal molecules between substrates of the conventional liquid crystal display device shown in FIGS. 1 and 2 when a voltage is applied. As shown in this FIG. 5, in the conventional MVA liquid crystal display device, the liquid crystal molecules in the vicinities of the alignment films are almost perpendicular to the surfaces of the substrates, and the other liquid crystal molecules are aligned with a direction tilted relative to the electric flux line E. In this case, the tilt directions of the liquid crystal molecules are determined by the protrusions (domain regulation structures) 17 and 24.

Figure 6:
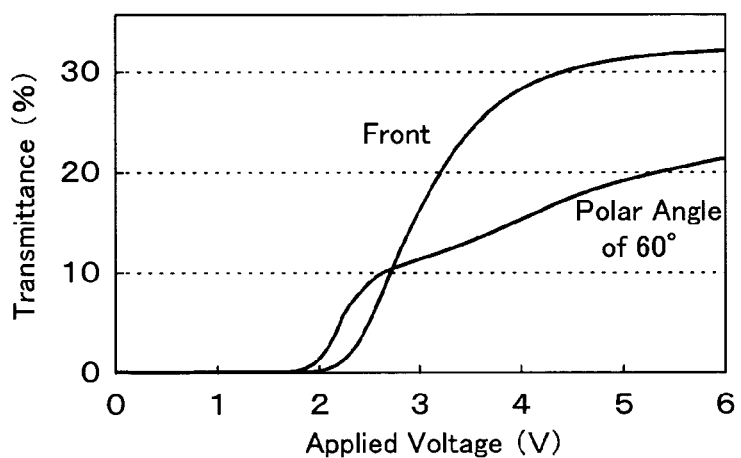
FIG. 6 is a diagram showing the results of simulation calculation of T-V characteristics when a screen of the conventional MVA liquid crystal display device is viewed from the front thereof (from the direction of the normal to a liquid crystal panel) and those when the screen is viewed from an oblique direction (direction of the absorption axis, a polar angle of 60°).

FIG. 6 is a diagram showing the results of simulation calculation of T-V (transmittance-applied voltage) characteristics when a screen of the conventional MVA liquid crystal display device is viewed from the front thereof (from the direction of the normal to the liquid crystal panel) and those when the screen is viewed from an oblique direction (direction of the absorption axis, a polar angle of 60°). In FIG. 6, the horizontal axis represents the applied voltage, and the vertical axis represents the transmittance. As can be seen from this FIG. 6, when a voltage (approximately 1.8 V to 2.5 V in this example) in the vicinity of the threshold is applied, the transmittance when the screen is viewed from the oblique direction becomes higher than that when the screen is viewed from the front thereof, and when a voltage higher than the foregoing is applied, the transmittance when the screen is viewed from the oblique direction becomes lower than that when the screen is viewed from the front thereof.

Figure 7:
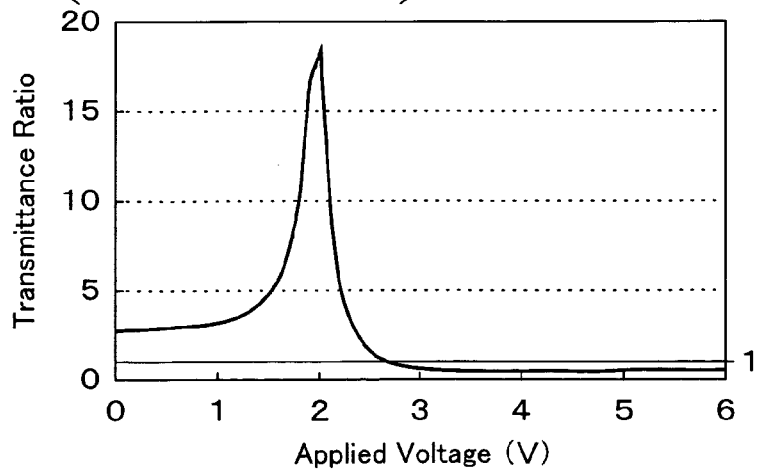
FIG. 7 is a diagram showing the result of simulation calculation of the relationship between an applied voltage and a transmittance ratio in the conventional MVA liquid crystal display device.

FIG. 7 is a diagram showing the result of simulation calculation of the relationship between the applied voltage and a transmittance ratio in the conventional MVA liquid crystal display device. In FIG. 7, the horizontal axis represents the applied voltage, and the vertical axis represents the transmittance ratio. The transmittance ratio is a value related to the ratio of the transmittance when the screen is viewed from an oblique direction (direction of the absorption axis, a polar angle of 60°) to that when the screen is viewed from the front thereof. In order to prevent discolor, it is preferred that the transmittance ratio is close to 1.

In the conventional liquid crystal display device, as shown in FIG. 7, when a voltage (approximately 1.8 V to 2.5 V) slightly higher than the threshold voltage is applied to a picture element electrode, the transmittance ratio significantly increases, and the maximum value thereof is approximately 18. When a voltage in the vicinity of the threshold voltage is applied to the picture element electrode, the transmittance in the direction of the front is low, and therefore it is largely different from the transmittance when the screen is viewed from the oblique direction. This causes discolor. Further, in the case where the applied voltage is high to a certain degree, the transmittance in the oblique direction becomes low compared to that in the direction of the front. However, in this case, the screen simply looks dark, but it is not felt that the color when the screen is viewed from the oblique direction is inferior to that when the screen is viewed from the front thereof.

Figure 8:
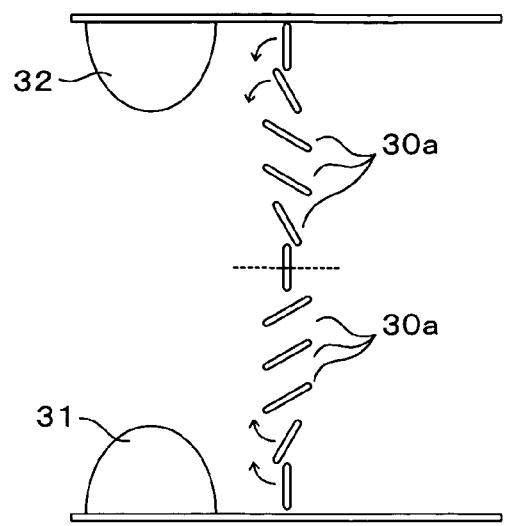
FIG. 8 is a schematic diagram showing a liquid crystal display device in which a protrusion of an opposing substrate is placed to be opposed to a protrusion of a TFT substrate.

FIG. 8 is a schematic diagram showing a liquid crystal display device in which a protrusion 32 of an opposing substrate is placed to be opposed to a protrusion 31 of a TFT substrate. In the case where the protrusions 31 and 32 having the same shape and the same height are placed to be opposed to each other as in this FIG. 8, it is supposed that, when a voltage is applied to electrodes, the tilt directions of liquid crystal molecules 30a become opposite between the upper and lower portions which are defined by setting the center in the cell thickness direction as a turning point.

Figure 9:
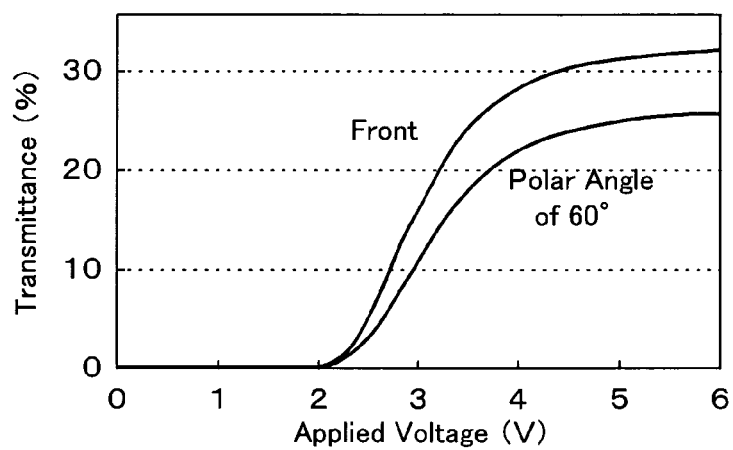
FIG. 9 is a diagram showing the results of simulation calculation of T-V characteristics when a screen of a liquid crystal display device in which liquid crystal molecules are aligned as shown in FIG. 8 is viewed from the front thereof and those when the screen is viewed from an oblique direction (direction of the absorption axis, a polar angle of 60°).
Figure 10:
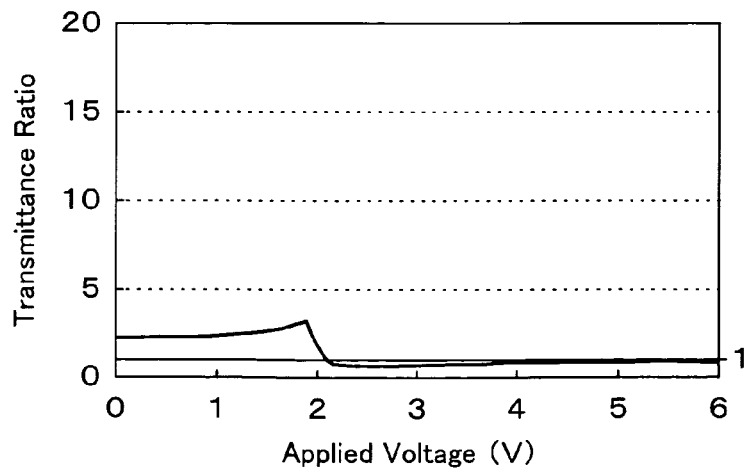
FIG. 10 is a diagram showing the result of simulation calculation of the relationship between the applied voltage and the transmittance ratio of the liquid crystal display device in which the liquid crystal molecules are aligned as shown in FIG. 8.

FIG. 9 is a diagram showing the results of simulation calculation of T-V characteristics when a screen of a liquid crystal display device in which liquid crystal molecules 30a are aligned as shown in FIG. 8 is viewed from the front thereof and those when the screen is viewed from an oblique direction (direction of the absorption axis, a polar angle of 60°). In FIG. 9, the horizontal axis represents the applied voltage, and the vertical axis represents the transmittance. Further, FIG. 10 is a diagram showing the result of simulation calculation of the relationship between the applied voltage and the transmittance ratio of the liquid crystal display device in which the liquid crystal molecules 30a are aligned as shown in FIG. 8. In FIG. 10, the horizontal axis represents the applied voltage, and the vertical axis represents the transmittance ratio.

In the liquid crystal display device in which the liquid crystal molecules 30a are aligned as in FIG. 8, as shown in FIG. 9, the transmittance when the screen is viewed from the oblique direction does not become higher than that when the screen is viewed from the front thereof. Moreover, the maximum value of the transmittance ratio is approximately 3 as shown in FIG. 10. Thus, discolor is greatly improved compared to the case of the conventional MVA liquid crystal display device.

In this case, the alignment state as shown in FIG. 8 is actually very unstable. That is, the position (represented by a broken line in FIG. 8) of the boundary between the area where liquid crystal molecules 30a are tilted in one direction and the area where liquid crystal molecules 30a are tilted in the direction opposite to the foregoing is greatly changed by a slight variation in conditions of temperature or the like. Consequently, T-V characteristics are changed, and the deterioration in display quality is caused.

In order to prevent this, it can be considered that the heights of the protrusions 31 and 32 are set high to strengthen the power of regulating the tilt directions of liquid crystal molecules 30a. However, if the heights of the protrusions 31 and 32 are set high, the behavior of liquid crystal molecules 30a are significantly restrained. Accordingly, even if discolor can be prevented, transmittance characteristics, responsibility, and the like are deteriorated, and thus such a liquid crystal display device cannot withstand actual use.

Accordingly, in the present embodiment, as shown in the schematic diagram of FIG. 11, a protrusion 41 on one substrate side is formed to have a different shape (cross-sectional shape) or height from that of a protrusion 42 on the other substrate side. In the case where the protrusion 42 on one substrate side is formed to be higher than the protrusion 41 on the other substrate side and the tilt of the side surface of the protrusion 42 is set to a steeper angle than the tilt of the side surface of the protrusion 41 as shown in this FIG. 11, the length a, measured in the cell thickness direction, of the area where the tilt directions of liquid crystal molecules 30a are determined by the protrusion 42 becomes larger than the length b, measured in the cell thickness direction, of the area where the tilt directions of liquid crystal molecules 30a are determined by the protrusion 41.

Thus, by placing structures having different powers of regulating the tilt directions of liquid crystal molecules in a manner such that the structures are opposed to each other, it is possible to suppress the variation in the boundary position between two areas where the tilt directions of liquid crystal molecules are different from each other. Moreover, since the protrusions need not be formed to be extremely high, the deterioration in transmittance characteristics, responsibility, and the like can be avoided. This makes it possible to suppress the phenomenon (discolor) in which a screen looks whitish when it is viewed from an oblique direction, and to obtain favorable transmittance characteristics and responsibility.

FIG. 12 is a diagram showing the result of simulation calculation of T-V characteristics of a liquid crystal display device in which a:b=9:1 (a/b=9). In FIG. 12, the horizontal axis represents the applied voltage, and the vertical axis represents the transmittance. FIG. 13 is a diagram showing the result of simulation calculation of the relationship between the applied voltage and the transmittance ratio of the liquid crystal display device in which a:b=9:1. In FIG. 13, the horizontal axis represents the applied voltage, and the vertical axis represents the transmittance ratio.

As shown in FIG. 12, in the liquid crystal display device in which a:b=9:1, in the case where a voltage in the vicinity of the threshold voltage is applied, the transmittance when a screen is viewed from an oblique direction approaches that when the screen is viewed from the front thereof. In addition, as shown in FIG. 13, the maximum value of the transmittance ratio is approximately 9.

Figure 14:
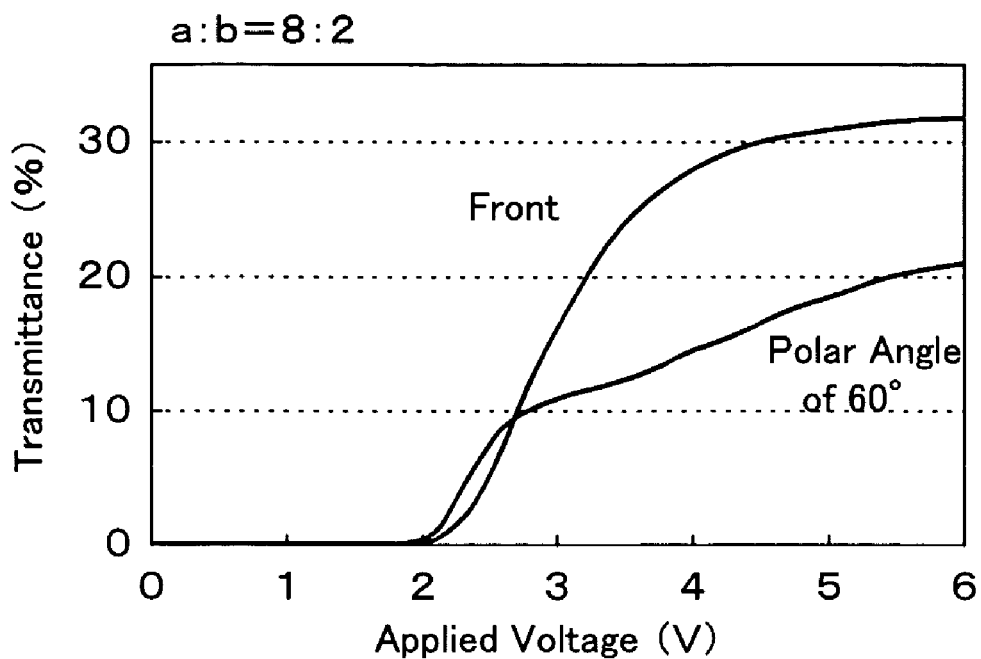
FIG. 14 is a diagram showing the result of simulation calculation of T-V characteristics of a liquid crystal display device in which, with regard to the ratio of the length a of one area in the layer thickness direction to the length b of the other area in the layer thickness direction, a:b=8:2 (a/b=4).
Figure 15:
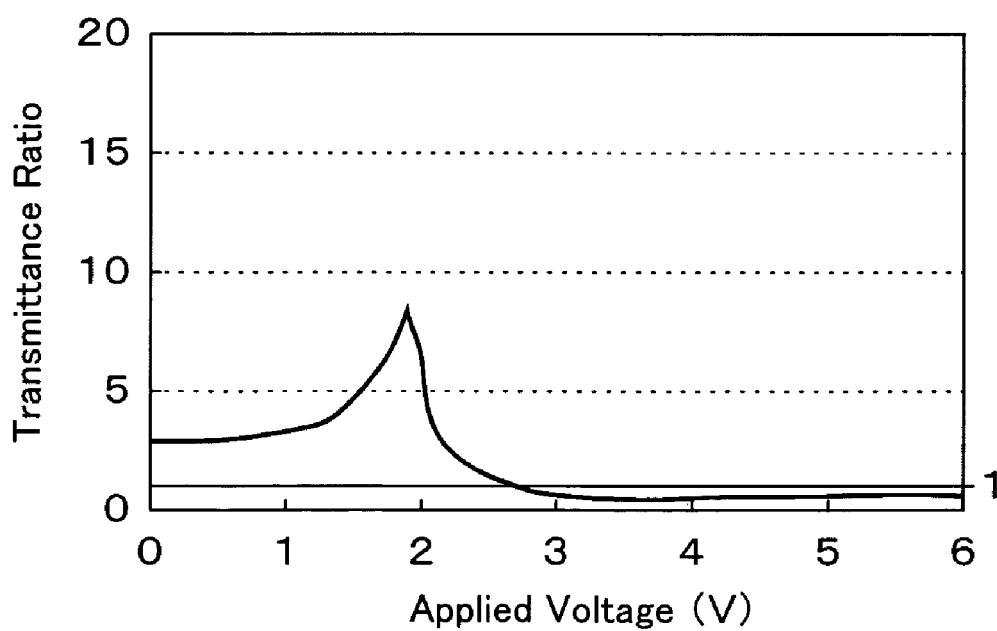
FIG. 15 is a diagram showing the result of simulation calculation of the relationship between an applied voltage and a transmittance ratio of the liquid crystal display device in which, with regard to the ratio of the length a of one area in the layer thickness direction to the length b of the other area in the layer thickness direction, a:b=8:2.

FIG. 14 is a diagram showing the result of simulation calculation of T-V characteristics of a liquid crystal display device in which a:b=8:2 (a/b=4). FIG. 15 is a diagram showing the result of simulation calculation of the relationship between the applied voltage and the transmittance ratio of the liquid crystal display device in which a:b=8:2. In FIG. 15, the horizontal axis represents the applied voltage and the vertical axis represents the transmittance ratio.

As shown in FIG. 14, in the liquid crystal display device in which a:b=8:2, in the case where a voltage in the vicinity of the threshold voltage is applied, the transmittance when a screen is viewed from an oblique direction further approaches that when the screen is viewed from the front thereof. In addition, as shown in FIG. 15, the maximum value of the transmittance ratio is approximately 8.

Figure 16:
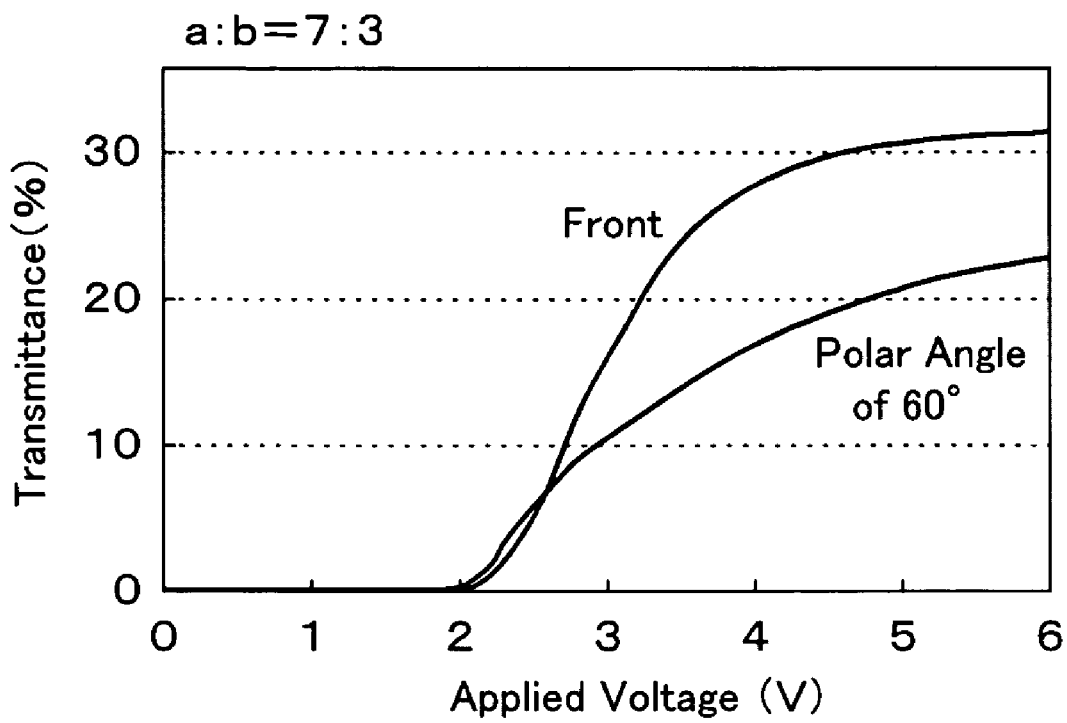
FIG. 16 is a diagram showing the result of simulation calculation of T-V characteristics of a liquid crystal display device in which, with regard to the ratio of the length a of one area in the layer thickness direction to the length b of the other area in the layer thickness direction, a:b=7:3 (a/b=2.3).
Figure 17:
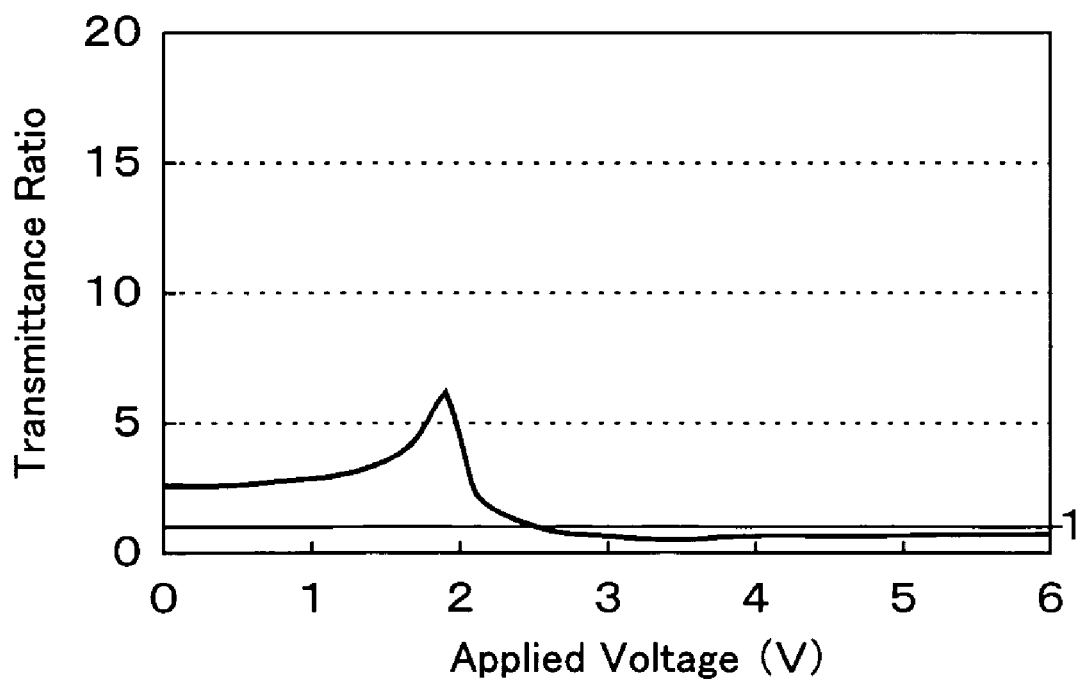
FIG. 17 is a diagram showing the result of simulation calculation of the relationship between an applied voltage and a transmittance ratio of the liquid crystal display device in which, with regard to the ratio of the length a of one area in the layer thickness direction to the length b of the other area in the layer thickness direction, a:b=7:3.

FIG. 16 is a diagram showing the result of simulation calculation of T-V characteristics of a liquid crystal display device in which a:b=7:3 (a/b=2.3). FIG. 17 is a diagram showing the result of simulation calculation of the relationship between the applied voltage and the transmittance ratio of the liquid crystal display device in which a:b=7:3. In FIG. 17, the horizontal axis represents the applied voltage, and the vertical axis represents the transmittance ratio.

As shown in FIG. 16, in the liquid crystal display device in which a:b=7:3, in the case where a voltage in the vicinity of the threshold voltage is applied, the transmittance when a screen is viewed from an oblique direction further approaches that when the screen is viewed from the front thereof. In addition, as shown in FIG. 17, the maximum value of the transmittance ratio is approximately 6.

Figure 18:
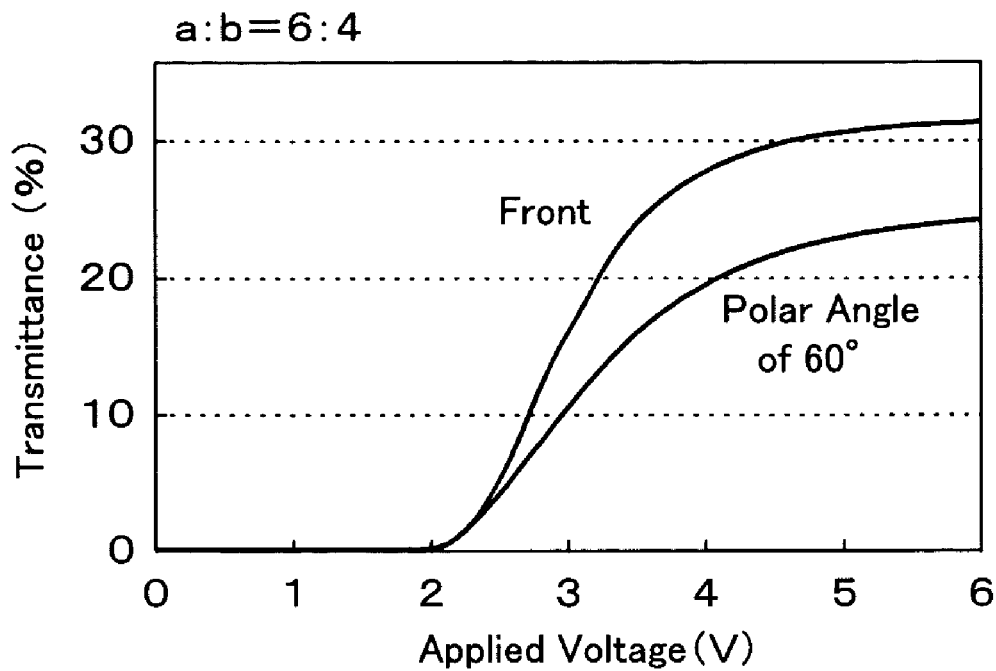
FIG. 18 is a diagram showing the result of simulation calculation of T-V characteristics of a liquid crystal display device in which, with regard to the ratio of the length a of one area in the layer thickness direction to the length b of the other area in the layer thickness direction, a:b=6:4 (a/b=1.5).
Figure 19:
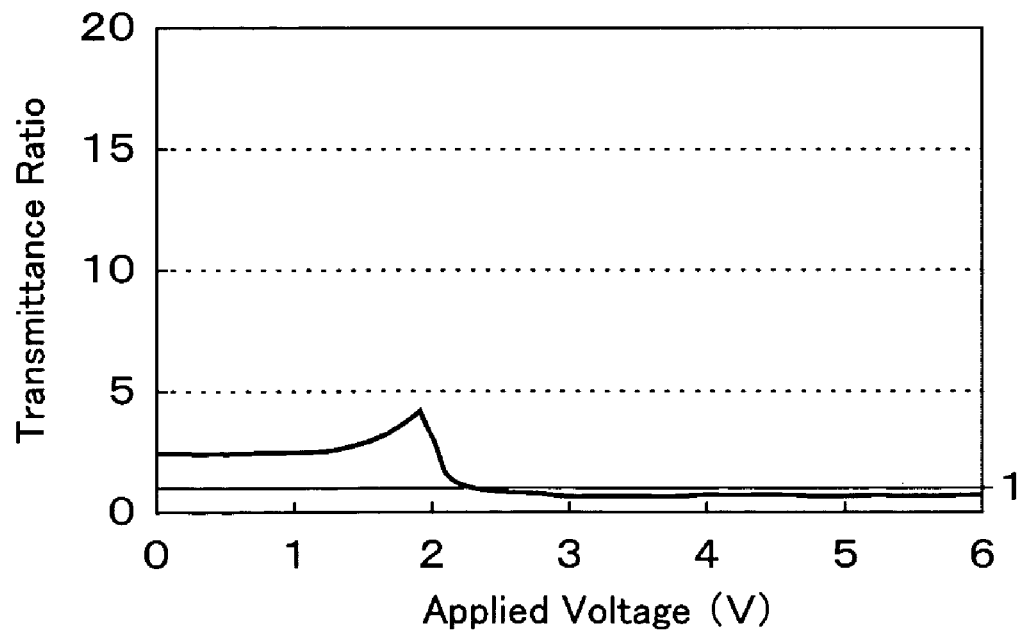
FIG. 19 is a diagram showing the result of simulation calculation of the relationship between an applied voltage and a transmittance ratio of the liquid crystal display device in which, with regard to the ratio of the length a of one area in the layer thickness direction to the length b of the other area in the layer thickness direction, a:b=6:4.

FIG. 18 is a diagram showing the result of simulation calculation of T-V characteristics of a liquid crystal display device in which a:b=6:4 (a/b=1.5). FIG. 19 is a diagram showing the result of simulation calculation of the relationship between the applied voltage and the transmittance ratio of the liquid crystal display device in which a:b=6:4. In FIG. 19, the horizontal axis represents the applied voltage, and the vertical axis represents the transmittance ratio.

As shown in FIG. 18, in the liquid crystal display device in which a:b=6:4, in the case where a voltage in the vicinity of the threshold voltage is applied, the transmittance when a screen is viewed from an oblique direction does not exceed that when the screen is viewed from the front thereof. In addition, as shown in FIG. 19, the maximum value of the transmittance ratio is approximately 4.

The inventors of the present application prepared various liquid crystal display devices in which protrusions 41 and 42 have different heights and shapes, and investigated the states of discolor. As a result, it has been turned out that, in a liquid crystal display device in which the relational expression $1 < a/b \leq 9$ is satisfied, discolor is reduced compared to the case of the conventional liquid crystal display device. Moreover, it has been turned out that, in a liquid crystal display device in which $1 < a/b \leq 2.5$ is satisfied, discolor is practically negligible. The present invention has been accomplished based on the above-described experiments and research results.

Note that the value a/b for each actual liquid crystal display device was found by measuring T-V characteristics when the screen is viewed from the front thereof and those when the screen is viewed from an oblique direction, calculating the transmittance ratio, and comparing the result with the simulation results.

Hereinafter, a concrete example of the first embodiment of the present invention will be described with reference to drawings.

Figure 20:
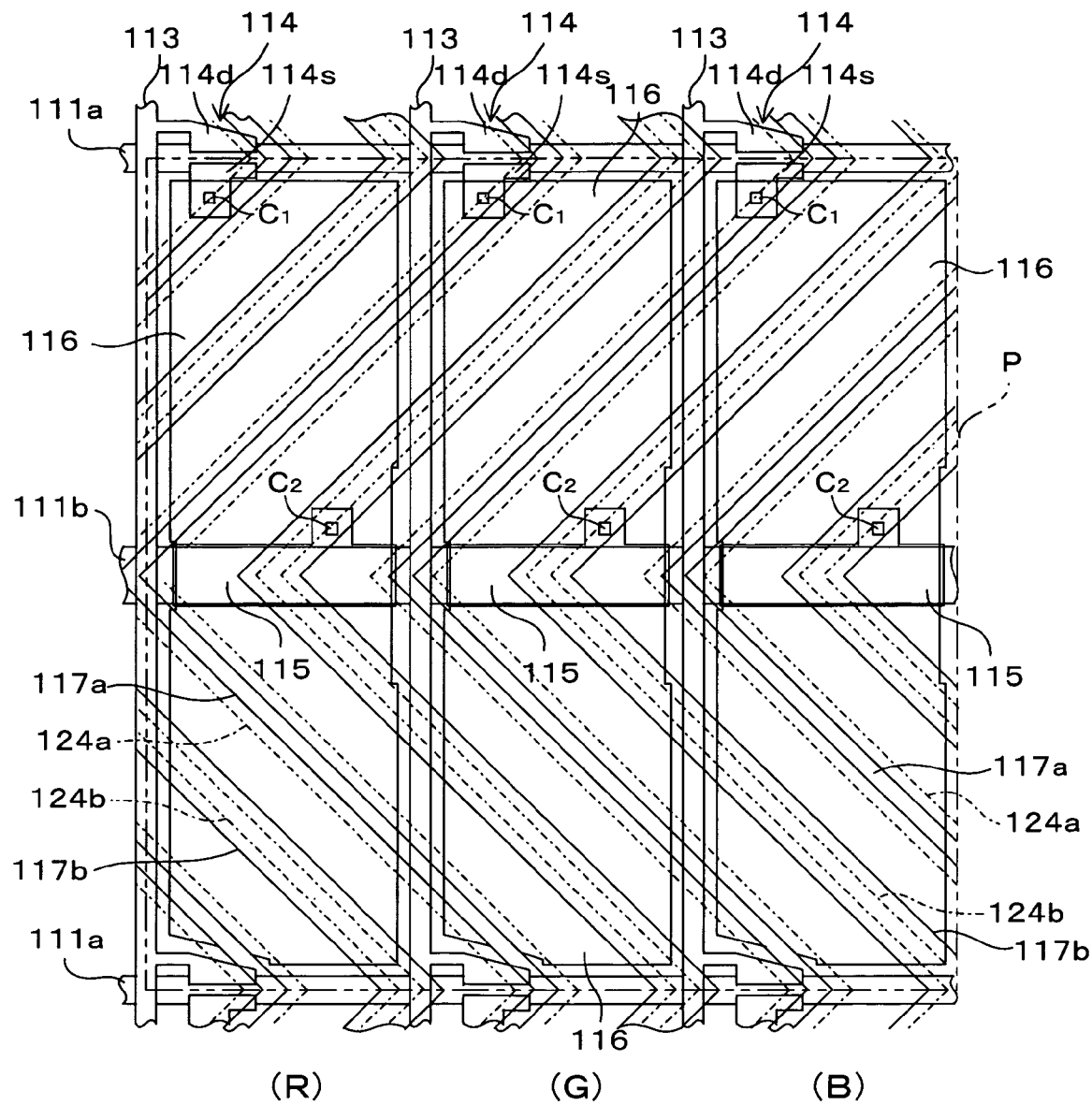
FIG. 20 is a plan view showing a picture element part of a liquid crystal display device of a first embodiment of the present invention.
Figure 21:
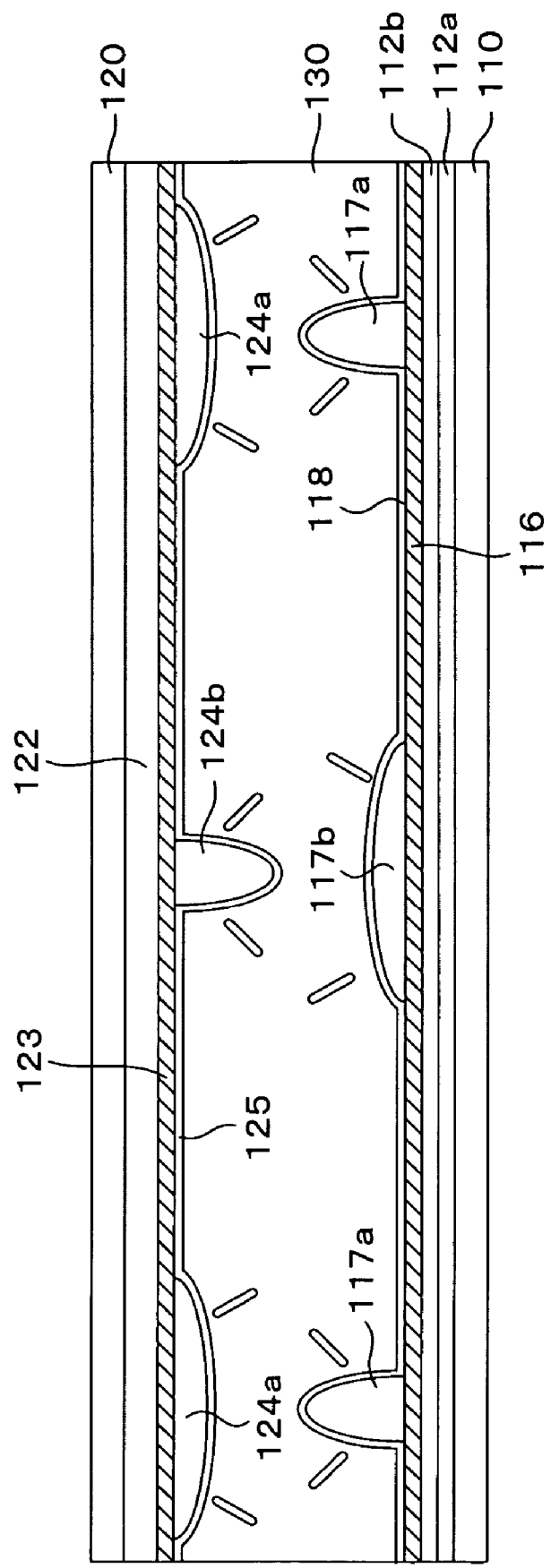
FIG. 21 is a schematic cross-sectional view of the liquid crystal display device of the first embodiment.

FIG. 20 is a plan view showing a picture element part of a liquid crystal display device of a first embodiment of the present invention. FIG. 21 is a schematic cross-sectional view of the same liquid crystal display device.

The liquid crystal display device of the present embodiment has first and second substrates 110 and 120 made of transparent thin plates of glass or the like, and a liquid crystal layer 130 made of nematic liquid crystal with negative dielectric anisotropy which fills the space between the substrates 110 and 120. As shown in FIG. 20, the substrate 110 is subject thereon to formation of a plurality of gate bus lines 111a and auxiliary capacitance bus lines 111b horizontally extending and a plurality of data bus lines 113 vertically extending. The gate bus lines 111a and the auxiliary capacitance bus lines 111b are placed alternately with respect to the vertical direction. The pitch of the gate bus lines 111a is, for example, 300 µm, and that of the data bus lines 113 is, for example, 100 µm.

Each of the rectangular areas surrounded by the gate and data bus lines 111a and 113 is defined as a picture element area. One pixel P is constitute of a red (R) picture element, a green (G) picture element, and a blue (B) picture element placed in a horizontal line.

The substrate 110 is subject for each picture element area thereon to formation of a TFT 114, an auxiliary capacitance electrode 115, and a picture element electrode 116. In the liquid crystal display device of the present embodiment, part of gate bus line 111a is used as the gate electrode of the TFT 114. Moreover, the drain electrode 114d of TFT 114 is connected to the data bus line 113. The picture element electrode 116 is made of transparent conductive material, such as ITO or the like, and electrically connected to the source electrode 114s of the TFT 114 and the auxiliary capacitance electrode 115 through contact holes $C_1$ and $C_2$. Further, the auxiliary capacitance electrode 115 is formed at a position where it is opposed to the auxiliary capacitance bus line 111b.

Hereinafter, a layered structure on the first substrate 110 will be described with reference to FIGS. 20 and 21.

The gate bus lines 111a and the auxiliary capacitance bus lines 111b are formed on the substrate 110. These gate bus lines 111a and auxiliary capacitance bus lines 111b are completed by forming, for example, a Cr (chromium) film or a stacking film of Al (aluminum) and Ti (titanium) on the substrate and then patterning the Cr film or the stacking film by photolithography.

These gate bus lines 111a and auxiliary capacitance bus lines 111b are covered with a first insulating film (gate insulating film) 112a formed on the substrate 110. The first insulating film 112a is formed by depositing silicon oxide or silicon nitride on the substrate 110 by, for example, CVD (chemical vapor deposition) method.

In predetermined areas on the first insulating film 112a, semiconductor layers (not shown) to be active layers of the TFTs 114 are formed. These semiconductor layers are made of, for example, amorphous silicon or polysilicon having a thickness of 20 to 100 nm. On these semiconductor layers, channel protection films (not shown), the source and drain electrodes 114s and 114d are formed. Moreover, on the first insulating film 112a, the data bus lines 113 and the auxiliary capacitance electrodes 115 are formed. These source and drain electrodes 114s and 114d, data bus lines 113, and auxiliary capacitance electrodes 115 have two-layer structure of, for example, an amorphous silicon layer heavily doped with impurities and a metal layer (Ti—Al—Ti).

A second insulating film 112b is formed on these source and drain electrodes 114s and 114d, data bus lines 113, and auxiliary capacitance electrodes 115. This second insulating film 112b is made of, for example, silicon oxide or silicon nitride. On the second insulating film 112b, the picture element electrodes 116 are formed of transparent conductive material such as ITO or the like.

The picture element electrodes 116 is subject thereon to formation of first and second protrusions 117a and 117b extending in oblique directions relative to the data bus lines 113. Each of the first and second protrusions 117a and 117b bends at the portions where it intersects gate bus lines 111a and auxiliary capacitance bus lines 111b. For example, the heights of the first protrusions 117a are 1.4 µm, and the widths thereof are 5 µm. Further, the heights of the second protrusions 117b are 0.5 µm, and the widths thereof are 15 µm. As shown in FIG. 20, the first and second protrusions 117a and 117b are alternately placed in the horizontal direction. Moreover, both first and second protrusions 117a and 117b are formed of photoresist. The surfaces of the picture element electrodes 116 and the protrusions 117a and 117b are covered with an alignment film 118 made of polyimide or the like.

Hereinafter, a layered structure on the second substrate 120 will be described with reference to FIG. 21.

On the surface of the substrate 120 which faces the liquid crystal layer 130, a black matrix (not shown) made of metal, such as Cr or the like, and color filters 122 are formed. The black matrix is formed in portions where it is opposed to the gate and data bus lines 111a and 113 and the TFTs 114. Further, a color filter 122 of any color of red (R), green (G), and blue (B) is formed to be opposed to the picture element electrode 116 in each picture element area. In this example, one pixel P is constituted of three picture elements placed in a horizontal line, i.e., a red picture element in which a red filter is placed, a green picture element in which a green filter is placed, and a blue picture element in which a blue filter is placed.

The color filters 122 is subject thereon to formation of an opposing electrode (common electrode) 123 made of transparent conductive material, such as ITO or the like. Moreover, the opposing electrode 123 is subject thereon to formation of third and fourth protrusions 124a and 124b. The third protrusions 124a have heights of 0.5 µm and widths of 15 µm, and are formed at positions where they are opposed to the first protrusions 117a. Further, the fourth protrusions 124b have heights of 1.4 µm and widths of 5 µm, and are formed at positions where they are opposed to the second protrusions 117b. The surfaces of the opposing electrode 123 and the third and fourth protrusions 124a and 124b are covered with an alignment film 125 made of polyimide or the like.

The substrates 110 and 120 are placed in a manner such that the surfaces thereof on which the alignment films 118 and 125 are formed are opposed to each other. The space between these substrates 110 and 120 is filled with nematic liquid crystals with negative dielectric anisotropy. In the liquid crystal display device of the present embodiment, the cell thickness of the liquid crystal panel is set to, for example, 4 to 6 µm.

Incidentally, the protrusions 117a, 117b, 124a, and 124b may be arbitrarily formed as long as the length a, measured in the cell thickness direction, of the area where the tilt directions of liquid crystal molecules are determined by the protrusions on one substrate and the length b, measured in the cell thickness direction, of the area where the tilt directions of liquid crystal molecules are determined by the protrusions provided on the other substrate satisfy the relational expression $1 < a/b \leqq 9$ (more preferably $1 < a/b \leqq 2.5$) as described previously. The value a/b can be found by measuring T-V characteristics when the screen is viewed from the front of the actual liquid crystal display device and those when the screen is viewed from an oblique direction and comparing the result with the simulation results as described previously.

The liquid crystal panel is configured as described above. Two polarizing plates are placed with this liquid crystal panel interposed therebetween in the state where the absorption axes thereof are orthogonal. The liquid crystal panel is connected to a driving circuit.

Figure 22:
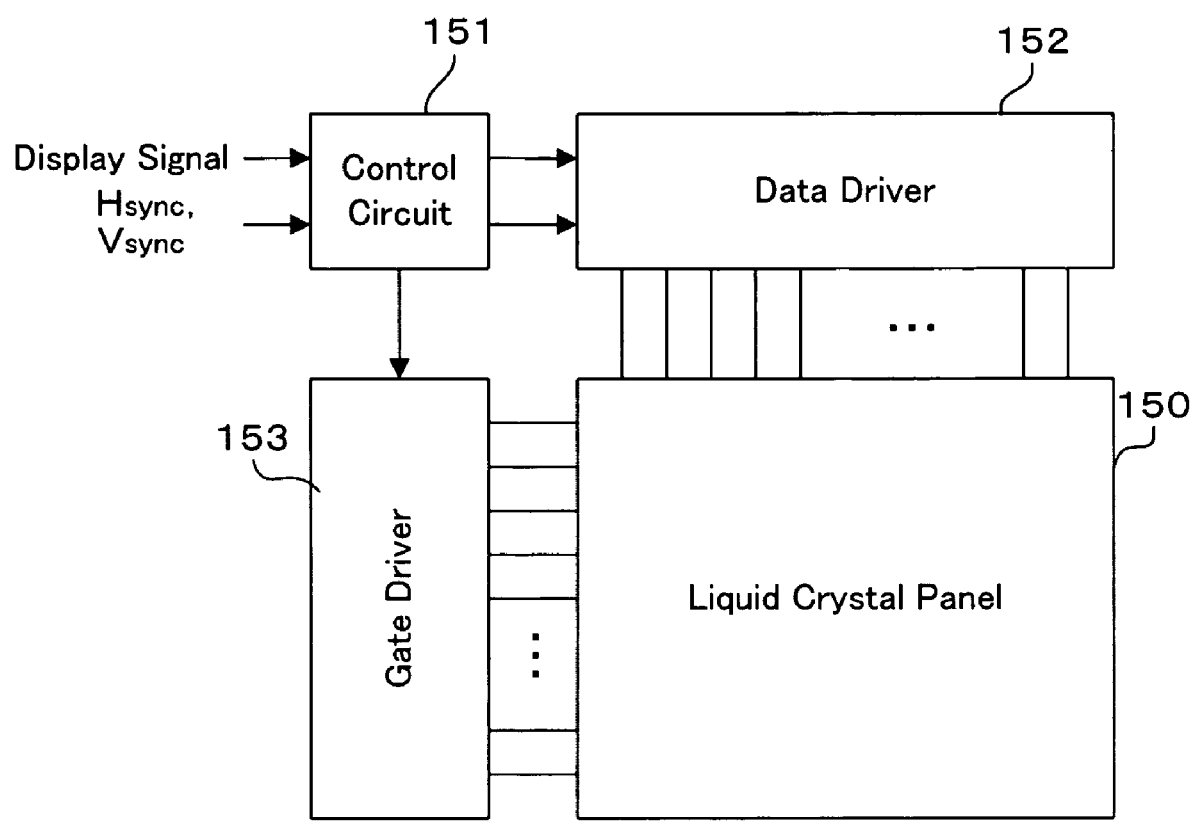
FIG. 22 is a block diagram showing a driving circuit of the liquid crystal display device of the first embodiment.

FIG. 22 is a block diagram showing the driving circuit of the liquid crystal display device of the present embodiment. The driving circuit includes a control circuit 151, a data and gate driver 152 and 153. The data and gate drivers 152 and 153 are connected to the liquid crystal panel 150. The control circuit 151 inputs display signals (R, G, and B signals), a horizontal synchronizing signal (Hsync), a vertical synchronizing signal (Vsync), and the like from a device such as a computer or the like. The control circuit 151 outputs a data clock signal and the R, G, and B signals to the data driver 152, and outputs a gate clock signal to the gate driver 153. The data driver 152 outputs the R, G, and B signals to a predetermined data bus line 113 of the liquid crystal panel 150 with timing based on the data clock signal. Further, the gate driver 153 outputs a scan signal to a predetermined gate bus line 111a of the liquid crystal panel 150 with timing based on the gate clock signal.

When the scan signal is supplied to the gate bus line 111a, the TFT 114 connected to the gate bus line 111a is turned on, and the display signal is written to the picture element electrode 116. This causes the liquid crystal molecules between the picture element electrode 116 and the opposing electrode 123 to vertically or obliquely align with the electric field, and an image is displayed on the liquid crystal panel 150.

In the present embodiment, since structures (i.e., protrusions 117a, 117b, 124a, and 124b having different heights and cross-sectional shapes) having different powers of regulating the tilt directions of liquid crystal molecules are placed to be opposed to each other on a pair of substrates 110 and 120, two areas where the tilt directions of liquid crystal molecules are different are formed along the cell thickness direction. This suppresses the phenomenon (discolor) in which a portion with a low brightness looks whitish when the screen is viewed from an oblique direction. Moreover, since the heights of these protrusions 117a, 117b, 124a, and 124b need not be set extremely high, the deterioration in transmittance characteristics, responsibility, and the like can be avoided.

Note that, though the description has been performed for the case where the present invention is applied to a transmission type liquid crystal display device in the above-described embodiment, the present invention may be applied to a reflection type liquid crystal display device or a semi-transmission type liquid crystal display device.

Moreover, in the aforementioned embodiment, the description has been performed for the case where both domain regulation structures formed on the TFT and opposing substrates are protrusions. However, slits provided in at least any one of the picture element electrode and the opposing electrode, or dents (grooves) provided in the surfaces (electrodes or an insulating film thereon) of the substrates may be used as the domain regulation structures.

Figure 23:
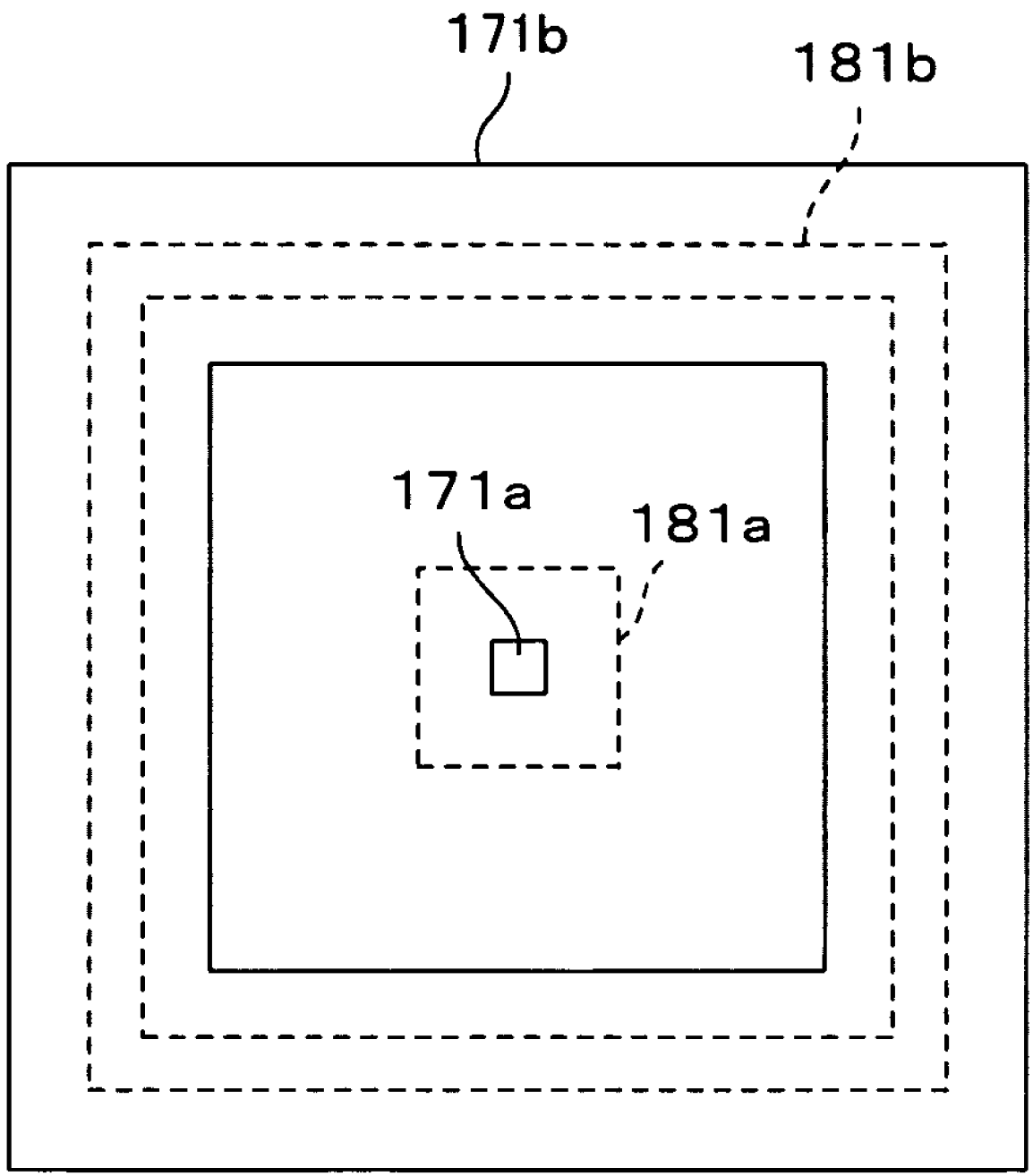
FIG. 23 is a schematic diagram showing a liquid crystal display device as a modified example of the first embodiment in which protrusions are formed so that radial alignment can be obtained.

Furthermore, in the aforementioned embodiment, the description has been performed for the case where the domain regulation structures (protrusions 117a, 117b, 124a, and 124b) are formed along the data bus lines 113 in zigzag. However, the domain regulation structures may be formed to be simple stripes. Alternatively, as shown in FIG. 23, protrusions 171a and 171b on one substrate and protrusions 181a and 181b on the other substrate may be formed in a pattern (protrusions 171a and 181a of dot-shaped patterns and protrusions 171b and 181b of frame-shaped patterns which surround the foregoing) from which radial alignment is obtained.

Second Embodiment

As described previously, optical compensation films have been heretofore used in order to improve viewing angle characteristics (Patent Literature 3). In general, the optical compensation film in use is that in which any relational expression of nx>ny=nz, nx=ny>nz, or nx>ny>nz is satisfied, where the refractive indexes of the optical compensation film in in-plane directions (x direction and y direction) are denoted by nx and ny, and the refractive index thereof in the thickness direction is denoted by nz. However, in the case where such an optical compensation film is used, the optical axis exists in the in-plane direction of the film or in the direction of the normal to the film. Consequently, it is in principle impossible to improve characteristics when a screen is viewed from the direction of the absorption axis of a polarizing plate.

Accordingly, in the present embodiment, optical compensation layers of which optical axes are tilted relative to the surfaces of substrates are used. Note that, in an MVA liquid crystal display device, since the directions in which liquid crystal molecules are tilted when a voltage is applied are different respectively among a plurality of areas divided by domain regulation structures, optical compensation layers each of which has different optical axes for the respective areas are required.

Figure 24:
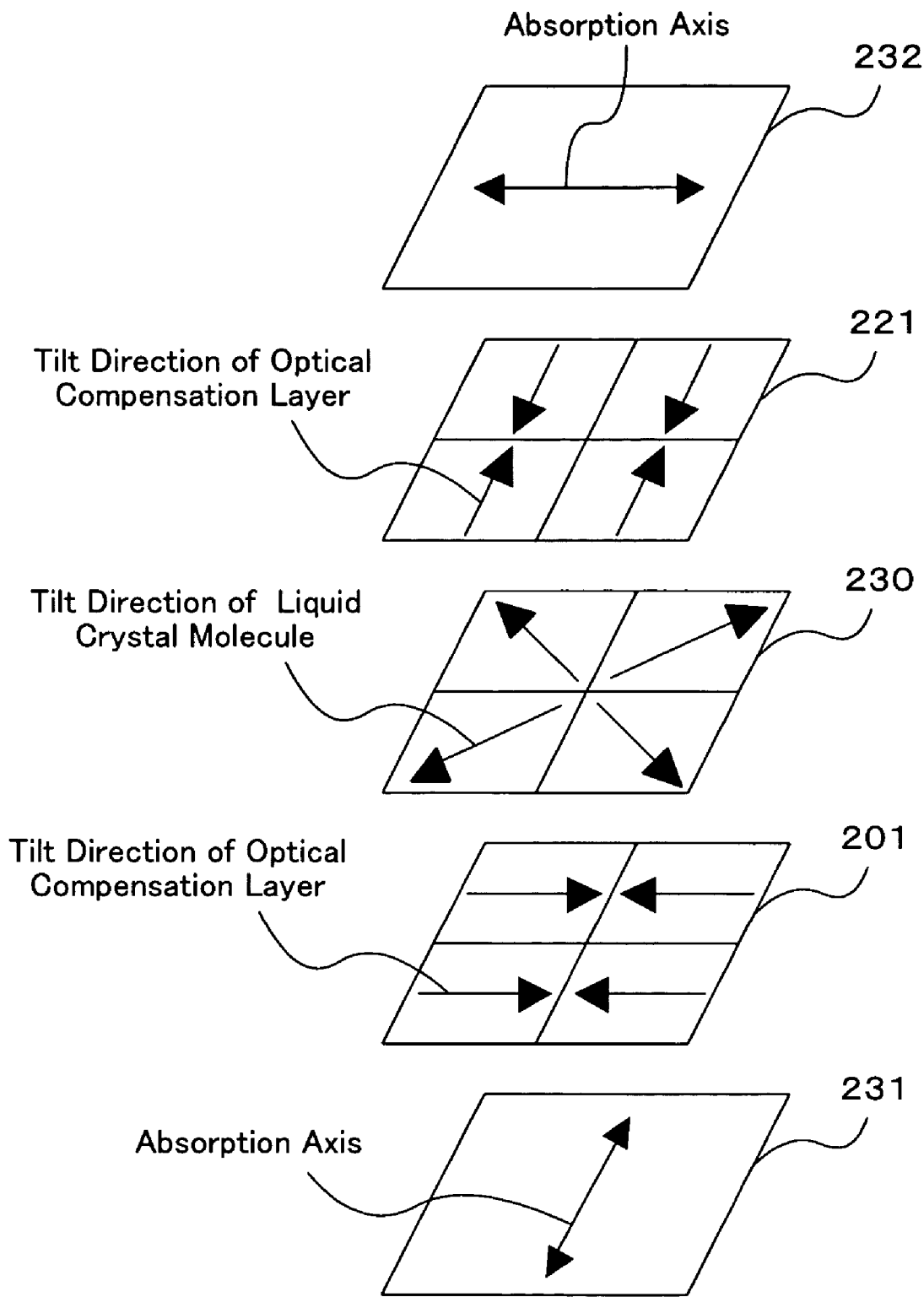
FIG. 24 is a schematic diagram showing the configuration of a liquid crystal display device according to a second embodiment of the present invention.

FIG. 24 is a schematic diagram showing the configuration of a liquid crystal display device according to a second embodiment of the present invention. In the present embodiment, a liquid crystal layer 230 is divided into four areas where the tilt directions of liquid crystal molecules are different from each other, by domain regulation structures. Accordingly, as each of optical compensation layers 201 and 221, one described as follows are used: the optical axis is tilted relative to the surfaces of substrates, and the direction (direction of the optical axis when the optical axis is projected onto the substrate planes) of the optical axis is set in a manner such that the direction of the optical axis is orthogonal (or parallel) to the absorption axis of the adjacent polarizing plate, for example, as shown by arrows in FIG. 24. Moreover, in the present embodiment, the optical compensation layers 201 and 221 are placed between the liquid crystal layer 230 and the polarizing plate 231 and between the liquid crystal layer 230 and the polarizing plate 232, respectively.

With regard to the liquid crystal display device in which the optical compensation layers 201 and 221 having optical axes tilted relative to the surfaces of the substrates are respectively placed on opposite sides of the liquid crystal layer 230 as shown in this FIG. 24, viewing angle characteristics were investigated by simulation calculation with a following way. That is the way such as variously changing the refractive index anisotropy $\Delta nLC$ and thickness dLC of the liquid crystal layer 230, the tilt angles $\theta$ of the optical axes of the optical compensation layers 201 and 221 relative to the surfaces of the substrates, the refractive index anisotropies $\Delta n$ of the optical compensation layers 201 and 221, and the thickness d (total thickness) of the optical compensation layers 201 and 221.

The tilt directions of the optical axes of the optical compensation layers 201 and 221 are limited to the directions (i.e., four directions of 0°, 90°, 180°, and 270°) parallel or orthogonal to the directions of the absorption axes of the polarizing plates 231 and 232 so as to prevent the deterioration of contrast in the front view, and were therefore changed to the above-described four directions of 0°, 90°, 180°, and 270° in accordance with the tilt directions of liquid crystal molecules of the liquid crystal layer 230 which are adjacent thereto.

Figure 25A:
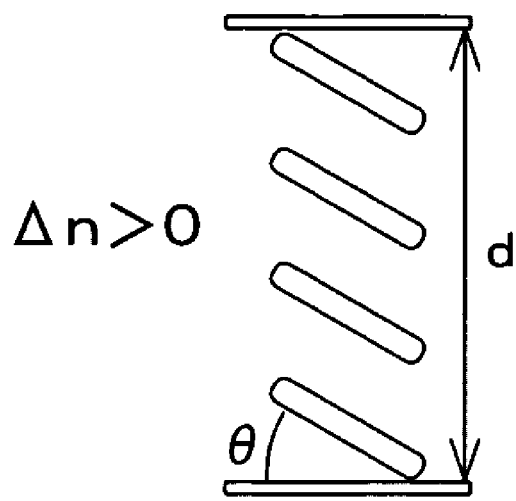
FIG. 25A is a schematic diagram showing an optical compensation layer with positive optical anisotropy.
Figure 25B:
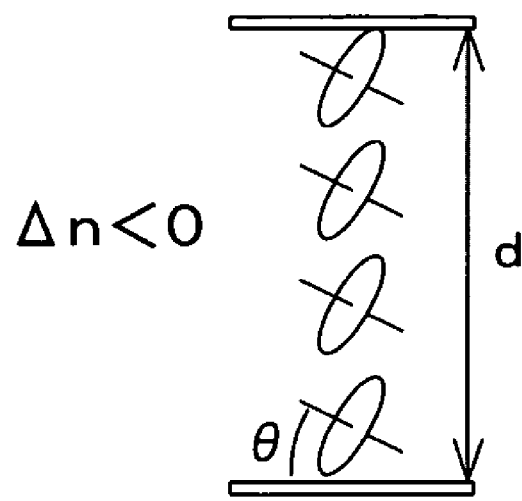
FIG. 25B is a schematic diagram showing an optical compensation layer with negative optical anisotropy.

For the case of an optical compensation layer with positive optical anisotropy (i.e., optical compensation layer of which dielectric anisotropy $\Delta n$ is positive ($\Delta n > 0$)) as shown in FIG. 25A and the case of an optical compensation layer with negative optical anisotropy (i.e., optical compensation layer of which dielectric anisotropy $\Delta n$ is negative ($\Delta n < 0$)) as shown in FIG. 25B, viewing angle characteristics were investigated by simulation calculation.

As a result, it has been turned out that an optical compensation layer with positive optical anisotropy leads to the effect of improving viewing angle characteristics when both of the relational expressions $0° < \theta \leq 30°$ and $\Delta n \cdot d \leq \Delta nLC \cdot dLC \times 1.2$ are satisfied. Moreover, it has been turned out that an optical compensation layer with negative optical anisotropy leads to the effect of improving viewing angle characteristics when both of the relational expressions $60°\leq\theta<90°$ and $|\Delta n|\cdot d\leq\Delta nLC\cdot dLC\times1.2$ are satisfied.

FIG. 24 shows the case where the optical compensation layers 201 and 221 are respectively placed on opposite sides of the liquid crystal layer 230. As a result of similarly investigating the case where three or more optical compensation layers are placed, it has been turned out that the optical compensation layers similarly lead to the effect of improving viewing angle characteristics when the above-described relational expressions are satisfied.

Hereinafter, concrete examples of the present embodiment will be described.

EXAMPLE 1

Figure 26:
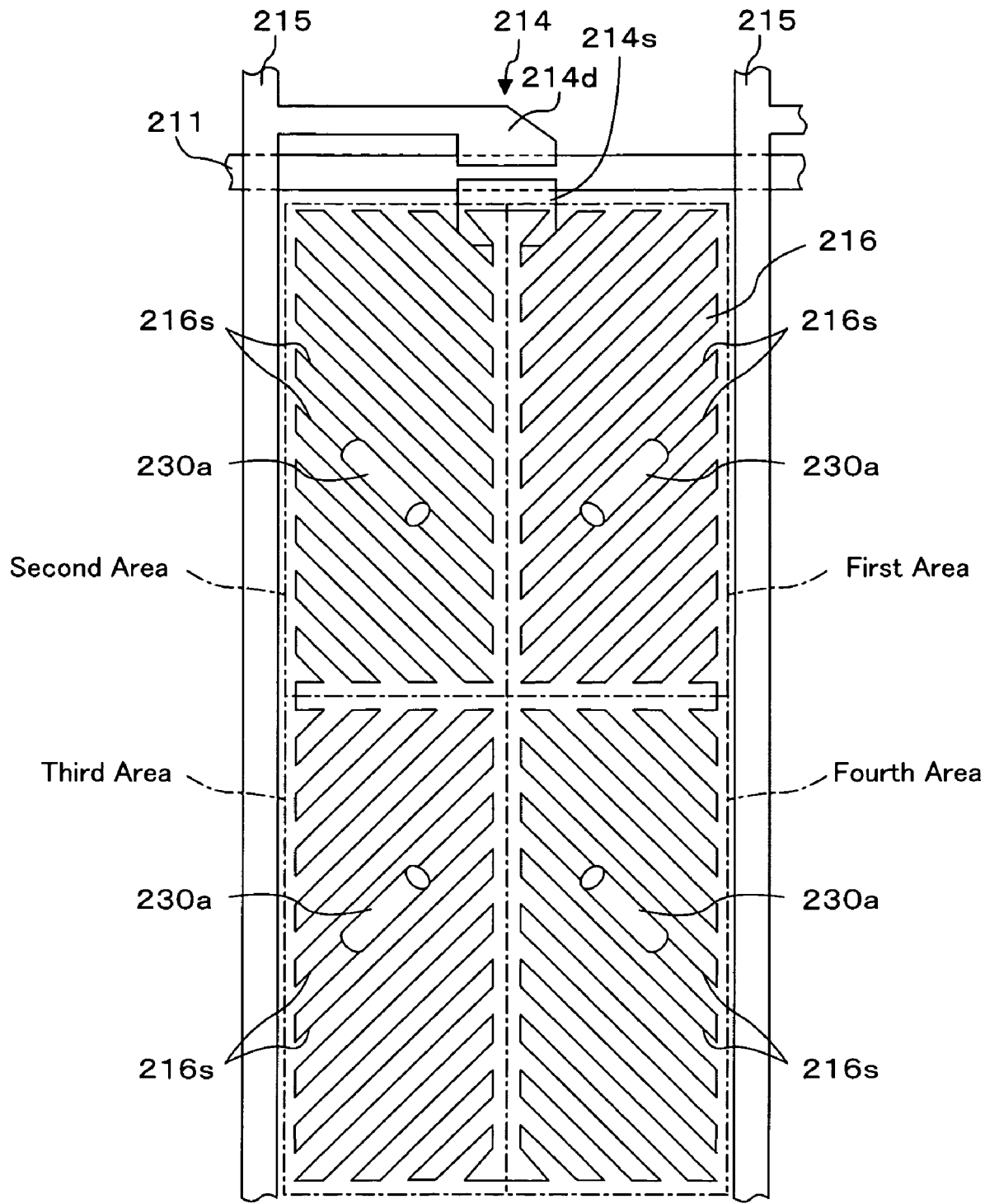
FIG. 26 is a plan view of a picture element part of the liquid crystal display device of the second embodiment.

FIG. 26 is a plan view of a picture element part of a liquid crystal display device of the present embodiment.

One glass substrate (TFT substrate) is subject thereon to formation of a plurality of gate bus lines 211 horizontally extending and a plurality of data bus lines 215 vertically extending. Each of the rectangular areas defined by these gate and data bus lines 211 and 215 is in accordance with a picture element area.

Each picture element area is subject thereon to formation of a TFT 214 and a picture element electrode 216. TFT 214 uses part of the gate bus line 211 as a gate electrode, and the drain electrode 214d of TFT 214 is connected to the data bus line 215. Moreover, the source electrode 214s of TFT 214 is electrically connected to the picture element electrode 216.

In order to achieve multi-domain having four alignment directions of liquid crystal molecules 230a within each picture element, the present embodiment is subject to employment of picture element electrode 216 which are divided into four areas where the directions of slits 216s are different from each other, for example, as shown in FIG. 26.

That is, slits 216s are provided at an angle of 45° relative to the x-axis direction (horizontal direction) in a first area (upper right area), slits 216s are provided at an angle of 135° relative to the x-axis direction in a second area (upper left area), slits 216s are provided at an angle of 225° relative to the x-axis direction in a third area (lower left area), and slits 216s are provided at an angle of 315° relative to the x-axis direction in a fourth area (lower right area).

In the case where picture element electrodes 216 having such shapes are used, when a voltage is applied between a picture element electrode 216s and a common electrode, liquid crystal molecules 230a are tilted in directions parallel to the slits 216s. At this time, under the influence of the edges of the electrode in the boundary portions of the four areas, the tilt directions of liquid crystal molecules 230a are opposite to each other between the first and third areas, and the tilt directions of liquid crystal molecules 230a are opposite to each other between the second and fourth areas. Accordingly, the tilt directions of liquid crystal molecules 230a are different from each other among the four areas.

Figure 27:
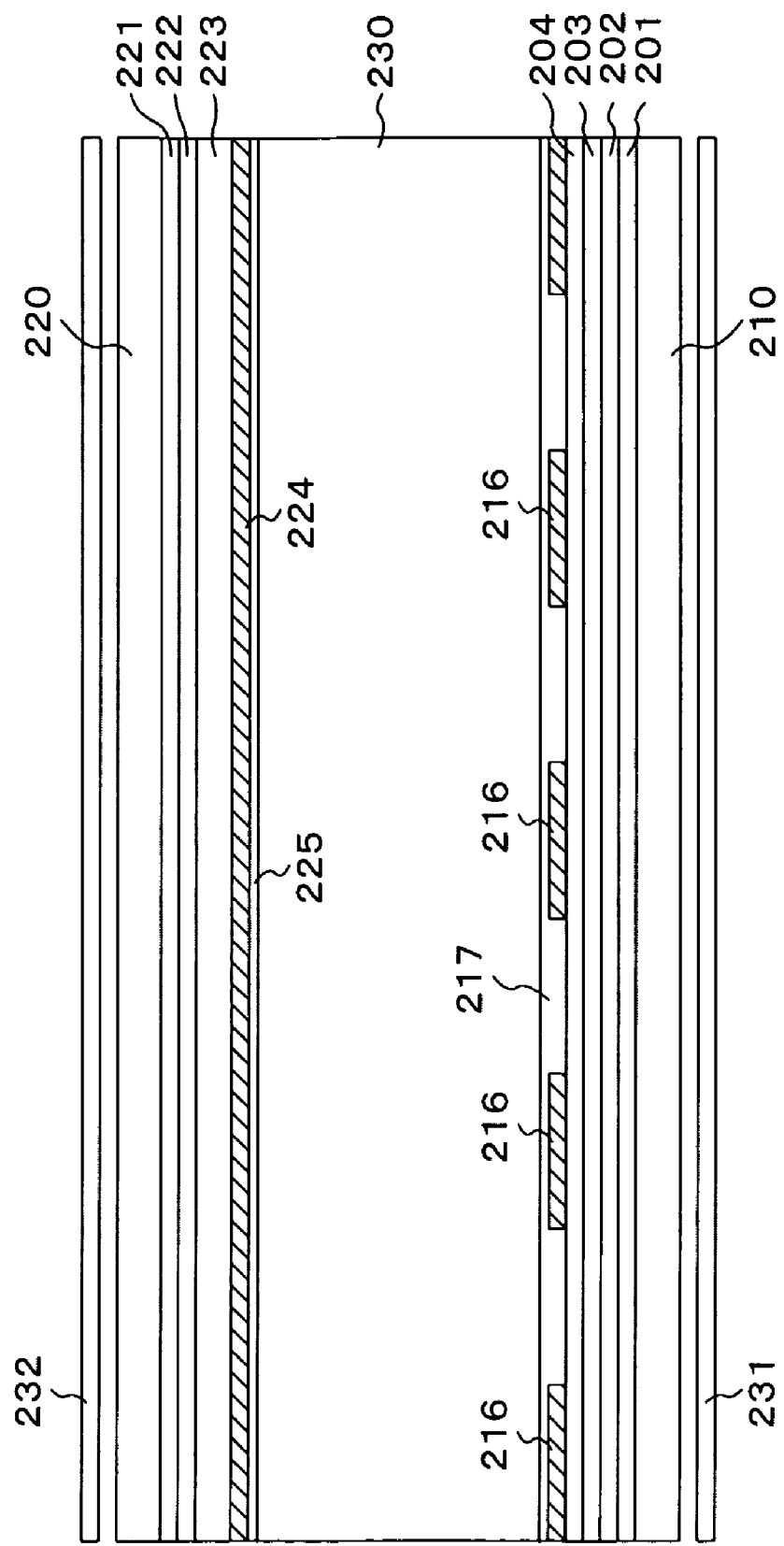
FIG. 27 is a schematic cross-sectional view of the liquid crystal display device of the second embodiment.

FIG. 27 is a schematic cross-sectional view of a liquid crystal display device of the present embodiment. Referring to this FIG. 27, a layered structure on a TFT substrate (first glass substrate 210) will be described.

The first glass substrate 210 is subject thereon to placement of an optical compensation layer 201 in which the directions of optical axes are respectively set depending on the first to fourth areas. This optical compensation layer 201 is formed by the following method.

Figure 28:
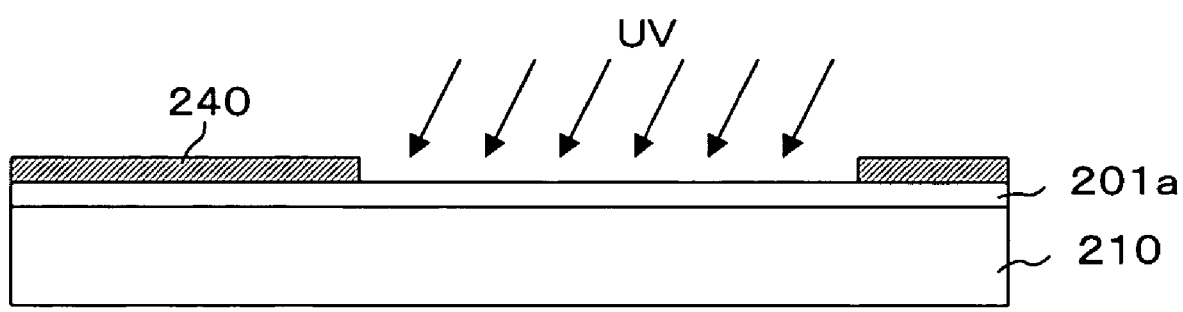
FIG. 28 is a schematic diagram showing a method of forming an optical compensation layer.

Specifically, as shown in FIG. 28, an alignment film 201a made of, for example, polyimide is formed on the glass substrate 210. Then, a first exposure mask 240 in which portions corresponding to the first and fourth areas are opened is placed on this alignment film 201a, and ultraviolet polarized light is applied thereto from a first direction which is oblique relative to the normal to the substrate 210. Thus, alignment regulation power which causes liquid crystal molecules to align with the ultraviolet light application direction occurs in the alignment film 201a in the first and fourth areas.

Similar to this, a second exposure mask in which portions corresponding to the second and third areas are opened is placed on the alignment film 201a, and then ultraviolet polarized light is applied thereto from a second direction which is oblique relative to the normal to the substrate. Thus, alignment regulation power which causes liquid crystal molecules to align with the ultraviolet light application direction occurs in the alignment film 201a in the second and third areas.

Next, solvent containing liquid crystalline polymers with positive dielectric anisotropy ($\Delta\epsilon>0$) is coated onto the surface of the alignment film 201a. As the liquid crystalline polymers, ones of a side chain type having a methyl skeleton and ones of a main chain type of the polyester series are suitable.

After the liquid crystalline polymers are aligned with predetermined directions by the alignment film 201a, the alignment of the liquid crystalline polymers is fixed by heat treatment.

Thus, it results in formation of the optical compensation layer 201 in which optical axes are tilted depending on the first to fourth areas. The tilt angles of optical axes of the optical compensation layer can be adjusted by the type of the alignment film and the tilt angle of ultraviolet polarized light applied to the alignment film. For i example, an optical compensation layer in which the relational expressions $\theta=15°$ and $\Delta n\cdot d=\Delta nLC\cdot dLC\times0.75$ are satisfied is formed by adjusting the tilt angles of the optical axes and the thickness with which liquid crystalline polymers are coated.

On the optical compensation layer 201 thus formed, as shown in FIG. 27, an insulating film 202 made of silicon oxide or silicon nitride is formed. On the insulating film 202, gate bus lines 211 are formed. On the insulating film 202 and the gate bus lines 211, a gate insulating film 203 is formed.

On the gate insulating film 203, similar to the first embodiment, semiconductor layers (not shown) to be active layers of TFTs 214, source and drain electrodes 214s and 214d, and data bus lines 215 are formed. On these semiconductor layers, source and drain electrodes 214s and 214d, and data bus lines 215, an insulating film 204 is formed. On the insulating film 204, picture element electrodes 216 made of ITO or the like are formed. Moreover, the surfaces of the picture element electrodes 216 are covered with an alignment film 217 made of polyimide.

Hereinafter, a layered structure on an opposing substrate (second glass substrate 220) will be described.

On the surface of the second glass substrate 220 which faces a liquid crystal layer, an optical compensation layer 221 is formed. This optical compensation layer 221 is formed by a method similar to that in the case of the optical compensation layer 201 on the first glass substrate 210 side. However, as shown in FIG. 24, the directions of optical axes in first to fourth areas of the optical compensation layer 221 are different from those of the optical compensation layer 201.

On the optical compensation layer 221, an insulating film 222 is formed. On the insulating film 222, a black matrix (not shown) and color filters 223 are formed. The black matrix is formed in portions where it is opposed to the gate bus lines 211, data bus lines 215 and the TFTs 214. Moreover, for each picture element, a color filter 223 of any color of red (R), green (G), and blue (B) is placed.

On the color filters 223, an opposing electrode 224 made of ITO is formed. Further, the surface of the opposing electrode 224 is covered with an alignment film 225 made of polyimide.

In this example, though domain regulation structures are not formed on the opposing substrate, protrusions or slits may be formed as domain regulation structures.

The two glass substrates 210 and 220 are placed with a liquid crystal layer 230 made of liquid crystals with negative dielectric anisotropy interposed therebetween in the state where the surfaces on which the alignment films 217 and 225 are formed are opposed to each other. Moreover, polarizing plates 231 and 232 are placed under the glass substrate 210 and over the glass substrate 220, respectively. These polarizing plates 231 and 232 are placed in the state where the absorption axes thereof are orthogonal each other as shown in FIG. 24.

Figure 29:
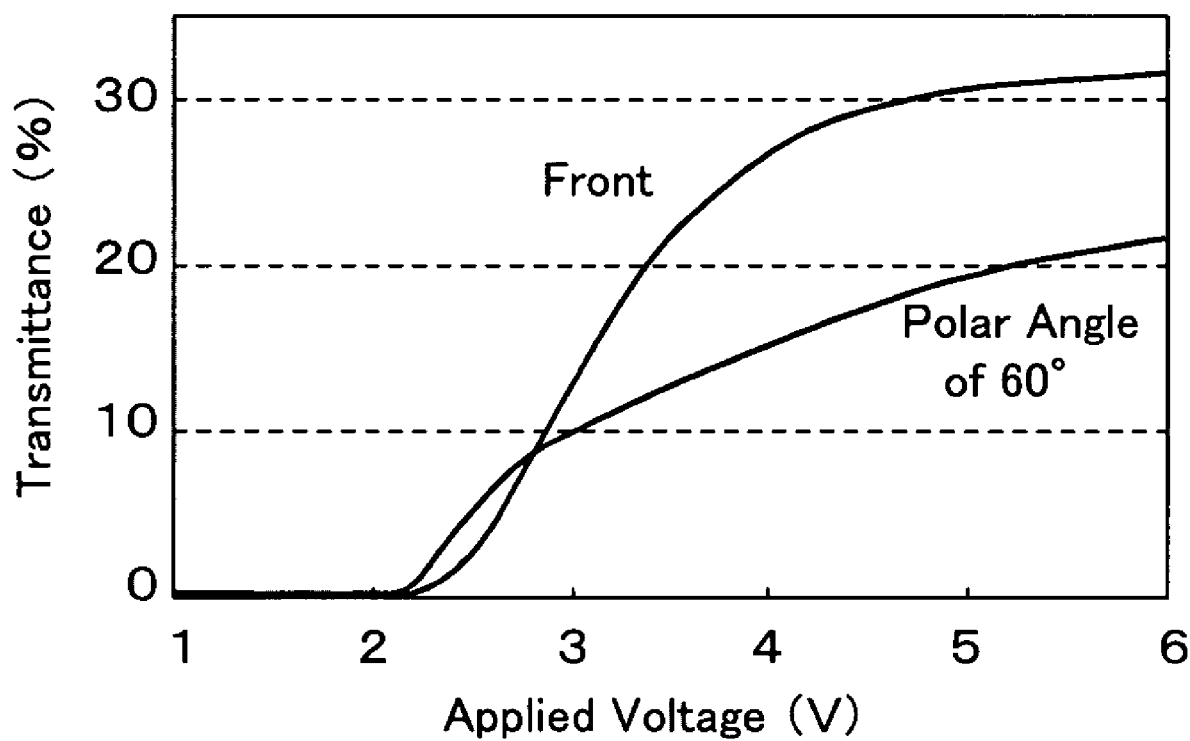
FIG. 29 is a diagram showing the result of simulating T-V characteristics of a liquid crystal display device (example 1) of the second embodiment.

FIG. 29 is a diagram showing the result of simulating T-V characteristics of the liquid crystal display device manufactured as described above. In FIG. 29, the horizontal axis represents the applied voltage, and the vertical axis represents the transmittance. As apparent from the comparison between this FIG. 29 and FIG. 6, the difference between T-V characteristics when a screen is viewed from the front thereof and those when the screen is viewed from an oblique direction is reduced in a region in which the applied voltage is low. Thus, it can be seen that the phenomenon (discolor) in which the screen looks whitish when viewed from an oblique direction is suppressed.

EXAMPLE 2

Figure 30:
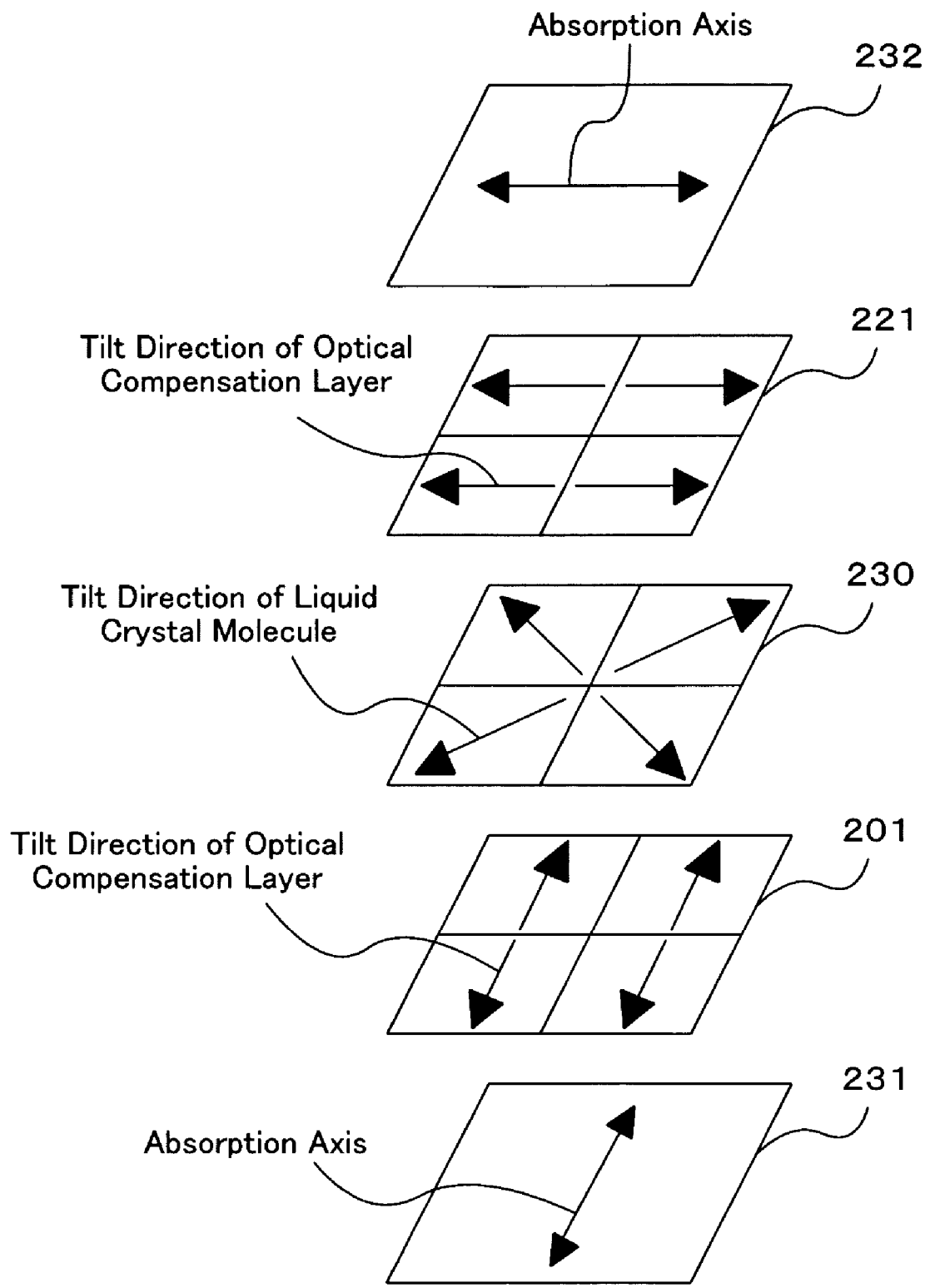
FIG. 30 is a schematic diagram showing the configuration of a liquid crystal display device (example 2) of the second embodiment.

FIG. 30 is a schematic diagram showing the configuration of a liquid crystal display device according to a second example of the second embodiment. This concrete example 2 is different from concrete example 1 in that the directions of optical axes of optical compensation layers 201 and 221 are different from each other. Since the other components are basically the same as those of concrete example 1, the present example will also be described with reference to FIGS. 26 and 27.

In the present example, a liquid crystalline discotic compound with negative optical anisotropy is used, and optical compensation layers 201 and 221 in which the directions of optical axes are set depending on first to fourth areas are placed between a liquid crystal layer 230 and a glass substrate 210 and between the liquid crystal layer 230 and a glass substrate 220, respectively. The optical compensation layer 201 is formed by the following method.

Specifically, on the glass substrate 210, an alignment film made of, for example, polyimide is formed. Then, an exposure mask in which portions corresponding to the first and second areas are opened is placed on this alignment film, and ultraviolet polarized light is applied thereto from a first direction which is oblique relative to the normal to the substrate 210. Thus, alignment regulation power which causes liquid crystal molecules to align with the ultraviolet light application direction occurs in the alignment film in the first and second areas.

Similar to the above, an exposure mask in which portions corresponding to the third and fourth areas are opened is placed on the alignment film, and ultraviolet polarized light is applied thereto from a second direction which is oblique relative to the normal to the substrate 210. Thus, alignment regulation power which causes liquid crystal molecules to align with the ultraviolet light application direction occurs in the alignment film in the third and fourth areas.

Next, solvent containing a liquid crystalline discotic compound and a polymerization agent is coated on the alignment film. Here, the liquid crystalline discotic compound has negative optical anisotropy ($\Delta\epsilon<0$) and photopolymerizability. As the liquid crystalline discotic compound, one made of a benzene derivative, a truxene derivative, a cyclohexane derivative, or the like is suitable.

After the liquid crystalline discotic compound is aligned with predetermined directions by the alignment film, ultraviolet light is applied to the entire surface to polymerize the liquid crystalline discotic compound, thus fixing the alignment. In this way, the optical compensation layer 201 in which optical axes are tilted depending on the first to fourth areas is formed.

The tilt angles of the optical axes can be adjusted by the type of the alignment film and the application angle of ultraviolet light applied to the alignment film. Moreover, optimum conditions for the optical compensation layer in the present invention can be realized by adjusting the tilt angles of the optical axes and the thickness with which the liquid crystalline discotic compound is coated.

The optical compensation layer on the glass substrate 220 side is also formed by a similar method. However, as shown in FIG. 30, the directions of the optical axes in the first to fourth areas of the optical compensation layer 221 on the glass substrate 220 side are different from those of the optical compensation layer 201.

Figure 31:
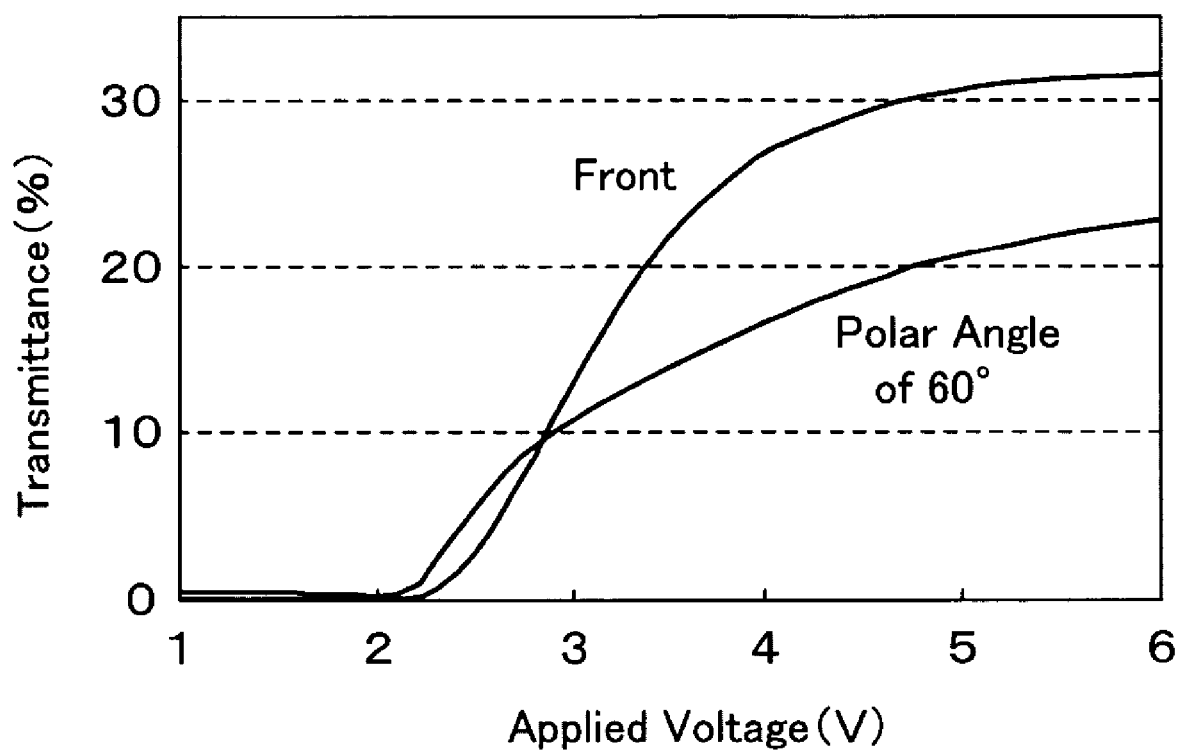
FIG. 31 is a diagram showing the result of simulating T-V characteristics of the liquid crystal display device (example 2) of the second embodiment.

FIG. 31 is a diagram showing the result of simulating T-V characteristics of the liquid crystal display device manufactured as described above. In FIG. 31, the horizontal axis represents the applied voltage, and the vertical axis represents the transmittance. As apparent from the comparison between this FIG. 31 and FIG. 6, the difference between T-V characteristics when a screen is viewed from the front thereof and those when the screen is viewed from an oblique direction is reduced in a region in which the applied voltage becomes low. Thus, it can be seen that the phenomenon (discolor) in which the screen looks whitish when viewed from an oblique direction is suppressed.

Incidentally, recently, the applicant of the present application has proposed a liquid crystal display device in which a plurality of areas having different threshold voltages of T-V characteristics from each other are provided within each picture element by, for example, partially forming a dielectric film on each picture element electrode in order to suppress discolor. Discolor can be further reduced by applying the present invention to such a liquid crystal display device.

What is claimed is:

1. A liquid crystal display device including a first substrate on which a first electrode is provided, a second substrate on which a second electrode is provided, and liquid crystals filling a space between the first and second substrates, the liquid crystal display device comprising:

a first structure provided on the first substrate, the first structure causing liquid crystal molecules in a vicinity of the first structure to align with a first direction when a voltage is applied; and a second structure provided at a position on the second substrate where the second structure is opposed to the first structure, the second structure causing liquid crystal molecules in a vicinity of the second structure to align with a second direction, which is different from the first direction, when the voltage is applied, wherein a relational expression $1<a/b\leq9$ is satisfied, where a length, measured in a layer thickness direction, of an area where liquid crystal molecules are aligned with the first direction is denoted by a, and a length, measured in the layer thickness direction, of an area where liquid crystal molecules are aligned with the second direction is denoted by b.

2. The liquid crystal display device according to claim 1, wherein there are a plurality of directions in which liquid crystal molecules are tilted when the voltage is applied, in substrate planes.

3. The liquid crystal display device according to claim 1, wherein the liquid crystals have negative dielectric anisotropy.

4. The liquid crystal display device according claim 1, wherein both the first and second structures are protrusions, and any one of a size or a shape of the first structure is different from that of the second structure.

5. A liquid crystal display device including a first substrate on which a first electrode is provided, a second substrate on which a second electrode is provided, and liquid crystals filling a space between the first and second substrates, the liquid crystal display device comprising:
- a first structure provided on the first substrate, the first structure causing liquid crystal molecules in a vicinity of the first structure to align with a first direction when a voltage is applied; and
- a second structure provided at a position on the second substrate where the second structure is opposed to the first structure, the second structure causing liquid crystal molecules in a vicinity of the second structure to align with a second direction, which is different from the first direction, when the voltage is applied, wherein a relational expression $1<a/b\leq2.5$ is satisfied, where a length, measured in a layer thickness direction, of an area where liquid crystal molecules are aligned with the first direction is denoted by a, and a length, measured in the layer thickness direction, of an area where liquid crystal molecules are aligned with the second direction is denoted by b.

6. The liquid crystal display device according claim 5, wherein both the first and second structures are protrusions, and any one of a size or a shape of the first structure is different from that of the second structure.

7. The liquid crystal display device according to claim 5, wherein there are a plurality of directions in which liquid crystal molecules are tilted when the voltage is applied, in substrate planes.

8. The liquid crystal display device according to claim 5, wherein the liquid crystals have negative dielectric anisotropy.

* * * * *